(12) United States Patent
Inaba et al.

(10) Patent No.: US 6,846,583 B2
(45) Date of Patent: Jan. 25, 2005

(54) MAGNETIC RECORDING MEDIUM AND MAGNETIC RECORDING APPARATUS

(75) Inventors: Nobuyuki Inaba, Hasuda (JP);
Tetsunori Kouda, Moriya (JP);
Hideaki Yamanaka, Toride (JP);
Satoshi Matsunuma, Kamakura (JP);
Enji Fujita, Matsudo (JP)

(73) Assignee: Hitachi Maxell, Ltd., Ibaraki (JP)

( * ) Notice: Subject to any disclaimer, the term of this patent is extended or adjusted under 35 U.S.C. 154(b) by 70 days.

(21) Appl. No.: 10/356,465

(22) Filed: Feb. 3, 2003

(65) Prior Publication Data

US 2003/0215675 A1 Nov. 20, 2003

Related U.S. Application Data

(63) Continuation of application No. PCT/JP01/09811, filed on Nov. 9, 2001.

(30) Foreign Application Priority Data

Nov. 9, 2000 (JP) ........................................ 2000-341392

(51) Int. Cl.$^7$ .............................. G11B 5/66; G11B 5/70; B32B 15/00; H01J 1/00
(52) U.S. Cl. .............................. 428/694 T; 428/694 TS; 428/694 TM; 428/667; 428/900; 428/611
(58) Field of Search ...................... 428/694 T, 694 TS, 428/694 TM, 667, 611, 900; 204/192.2, 192.12, 192.15; 427/130, 131

(56) References Cited

U.S. PATENT DOCUMENTS

| | | | | |
|---|---|---|---|---|
| 6,086,974 A | * | 7/2000 | Thiele et al. | ............... 428/65.3 |
| 6,231,968 B1 | * | 5/2001 | Hiramoto et al. | ........... 428/332 |
| 6,266,210 B1 | | 7/2001 | Shiroishi | |

FOREIGN PATENT DOCUMENTS

| | | |
|---|---|---|
| JP | A 61-267927 | 11/1986 |
| JP | A 2-165411 | 6/1990 |
| JP | A 5-334670 | 12/1993 |
| JP | A 6-151174 | 5/1994 |
| JP | A 7-141638 | 6/1995 |
| JP | A 7-141641 | 6/1995 |
| JP | A 7-296357 | 11/1995 |
| JP | A 2000-67401 | 3/2000 |
| JP | A 2000-311329 | 11/2000 |

OTHER PUBLICATIONS

Masaaki Futarnoto, Development of Low Noise Perpendicular Magnetic Recording Media for >50Gb/in$^2$ Areal Density, Apr. 25, 2001, pp. 29–40.

(List continued on next page.)

*Primary Examiner*—Holly Rickman
(74) *Attorney, Agent, or Firm*—Oliff & Berridge, PLC

(57) ABSTRACT

A magnetic recording medium comprises a magnetic recording layer 63 which is formed by using an ordered alloy containing B on a substrate 1 containing an amorphous component. A part of B in the ordered alloy is segregated in a grain boundary, and thus the magnetic interaction, which acts between magnetic grains, can be reduced. Accordingly, it is possible to form fine and minute magnetic domains in the magnetic recording layer 63, and it is possible to reduce the medium noise as well. The temperature, at which the substrate is heated during the film formation of the magnetic recording layer 63, can be suppressed to be low, because the ordering temperature for the ordered alloy containing B is lower than those of ordered alloys not containing B. Therefore, it is possible to use a substrate made of glass which is suitable for the mass production. The magnetic recording layer 63 is also excellent in thermal stability because of the use of the ordered alloy having high magnetic anisotropy. According to the present invention, it is possible to provide the magnetic recording medium for high density recording which is excellent in thermal stability and which involves low medium noise.

21 Claims, 9 Drawing Sheets

OTHER PUBLICATIONS

Inaba et al., "Microstructural segregation in CoCrTa and CoCrPt longitudinal magnetic recording media", Journal of Magnetism and Magnetic Materials, vol. 168, pp. 222–231, 1997.

Kikitsu et al., "Micromagnetic study of CoPt–$SiO_2$ granular films by spin–wave Brillouin scattering", Journal of Applied Physics, vol. 87, No. 9, pp. 6944–6946, 2000.

Inaba et al., "Crystallrgraphic Orientation Effect of Seedlayers Deposited by ECR Sputtering Method on Co–Cr–Pt Longitudinal Recording Media", Technical Report of IEICE, MR 2000–101, pp. 7–12, 2001.

Coffey et al., "High Anisotropy $L1_o$ Thin Films for Longitudinal Recording", IEEE Transactions on Magnetics, vol. 31, No. 6, pp. 2737–2739, 1995.

Ivanov et al., "Determination of the Anisotropy Constant and Saturation Magnetization, and Magnetic Properties of Powders of an Iron–Platinum Alloy", Fiz. mental. metalloved., vol. 35, No. 1, pp. 92–97, 1973.

* cited by examiner

MAGNETIC RECORDING MEDIUM AND MAGNETIC RECORDING APPARATUS

CROSS-REFERENCE

This application is a Continuation Application of International Application No. PCT/JP01/09811 which was filed on Nov. 9, 2001 claiming the conventional priority of Japanese patent Application No. 2000-341392 filed on Nov. 9, 2000.

BACKGROUND OF THE INVENTION

1. Field of the Invention

The present invention relates to a magnetic recording medium which is preferably used for the high density recording, a method for producing the same, and a magnetic recording apparatus. In particular, the present invention relates to a magnetic recording medium in which an ordered alloy is used for a magnetic recording layer, a method for producing the same, and a magnetic recording apparatus.

2. Description of the Related Art

Those present in the field of the magnetic recording include two recording systems, i.e., the in-plane magnetic recording system and the perpendicular magnetic recording system. At present, the former recording system is generally used. The in-plane recording system is a method in which recording bits are formed by effecting the magnetization in parallel to the surface of a magnetic recording medium in a direction so that the N pole of the magnetic poles mutually abuts against the N pole and the S pole mutually abuts against the S pole by using a magnetic recording head to perform the magnetic recording. In order to improve the recording density in the in-plane magnetic recording system, it is necessary that the influence of the demagnetizing field acting on the recorded bits is reduced, the film thickness of a magnetic film as a recording medium is decreased, and the coercivity in the film surface is increased.

On the other hand, the perpendicular magnetic recording system is a method in which recording bits are formed perpendicularly to a film surface on a magnetic recording medium having perpendicular magnetic anisotropy by using a magnetic head so that magnetization directions of adjoining bits are antiparallel to perform the magnetic recording. In this method, for example, a magnetic recording layer in a DC erased state is used, in which the magnetization is effected uniformly so that the entire surface, which is disposed on the side opposite to the substrate with respect to the magnetic recording layer, forms the S pole, and the entire surface, which is disposed on the side of the substrate, forms the N pole. Recording bits are formed oppositely to the magnetization direction so that those disposed on the side opposite to the substrate form the N pole and those disposed on the side of the substrate form the S pole. In this case, the magnetic poles of the adjoining bits are the S pole and the N pole, and the directions of magnetization of the adjoining bits are antiparallel. Therefore, the magnetic moments of the adjoining bits are attracted to one another, and the recording magnetization exists in a stable manner. The perpendicular magnetic recording system is roughly classified, depending on the difference in structures of the magnetic head and the medium, into two systems, i.e., a system in which the recording is performed by combining a thin film head and a single layer perpendicular medium, and a system in which the recording is performed by combining a single magnetic pole head and a two-layered perpendicular medium.

In the latter system, the following method is known. That is, a magnetic flux return layer, which is composed of a soft magnetic substance in order to return the magnetic flux from the single magnetic head, is provided under a magnetic recording layer. Accordingly, the magnetic flux, which is generated from a main magnetic pole of the single magnetic head, can be effectively introduced into the magnetic recording layer, and thus it is possible to write fine and minute bits. Therefore, the system, in which the recording is performed by combining the single magnetic head and the two-layered perpendicular medium, is more suitable for the high density recording than the system in which the recording is performed by combining the thin film head and the single layer perpendicular medium.

In any one of the recording systems of the in-plane magnetic recording system and the perpendicular magnetic recording system, it is important to increase the coercivity of the magnetic substance for constituting the magnetic recording layer of the magnetic recording medium in order to realize the high density of the magnetic recording medium. One of the factors which determine the coercivity of the magnetic substance is the crystalline magnetic anisotropy energy. This energy is indicative of the tendency of the magnetic moment in the magnetic crystal grain in a certain specified crystal direction. The larger the value of the energy is, the more promptly the magnetic moment tends to be directed in the direction. For example, in the case of the Co crystal grain, the direction, in which the magnetic moment tends to be directed, is the c-axis direction of the hexagonal close-packed crystal lattice (easy axis of magnetization). The crystalline magnetic anisotropy energy Ku is about $4.6 \times 10^6$ erg/cm$^3$. Assuming that V represents the volume of the crystal grain, the energy, with which the magnetic moment in the crystal grain is directed in the direction of the easy axis of magnetization, is given by KuV. On the other hand, the magnetic moment fluctuates due to the thermal motion. In this case, the energy is given by the product $k_BT$ of the Boltzmann's constant $k_B$ and the absolute temperature T. Comparison will now be made for $k_BT$ and KuV. In the case of $k_BT \ll KuV$, the magnetic moment is directed approximately in the c-axis direction of the crystal grain, because the magnetic anisotropy energy is sufficiently large. In the case of $k_BT \gg KuV$, the magnetic moment continues the thermal motion (superparamagnetic state), because the energy of the thermal motion is larger than the magnetic anisotropy energy. At present, in the discussion about the thermal stability of recording bits in the academic society, it is considered that the thermal stability of the medium can be secured if the value of $(KuV)/(k_BT)$ is 50 to 100.

In order to realize the high density recording in the in-plane magnetic recording system, a case will be considered, in which the crystal grain diameter and the film thickness are made halves of those used in the present circumstances. It is assumed that a magnetic substance, which has the magnetic anisotropy energy equivalent to that of Co, is used for the magnetic recording layer, and the medium is left to stand at room temperature (300 K.). On this assumption, $KuV/k_BT \sim 10$ is given, and the magnetization is unstable. Therefore, it is necessary to use, as the magnetic recording layer, a magnetic substance having a magnitude of the magnetic anisotropy energy which is five to ten times that of Co.

For example, as reported in O. A. Ivanov et al., Phys. Met. Metall., vol. 35 (1973) pp. 81, those known as the magnetic material having high magnetic anisotropy include $L1_0$ type ordered alloys such as Fe—Pt ordered alloy (Ku=$7.0 \times 10^7$ erg/cm$^3$) and Co—Pt ordered alloy (Ku=$7.0 \times 10^7$ erg/cm$^3$). K. R. Coffey et al. has made an evaluation by using, as an in-plane magnetic recording medium, one obtained by manufacturing a thin film based on the use of the $L1_0$ type ordered alloy on a silicon substrate (IEEE Trans. Magn. vol. 31 (1995) pp. 2737–2739). In this report, an ordered alloy layer to express high magnetic anisotropy is formed by performing a heat treatment at a high temperature of about 600° C. after forming the film, and thus high coercivity is obtained. However, it is necessary to perform the heat treatment at the high temperature of about 600° C. which exceeds the temperature region capable of being adopted for the glass substrate that is used for the magnetic disk. Therefore, it has been difficult to actually mass produce and industrially manufacture the magnetic disk. In general, the heat treatment at a high temperature brings about excessively large sizes of crystal grains. Therefore, the procedure as described above involves problems in view of the realization of fine and minute crystal grains required for the medium for the high density recording as well.

Those known as the technique for forming the thin film include the ECR sputtering method (Japanese Patent Application Laid-open No. 5-334670) in which a thin film is manufactured by using a plasma formed by means of the method of Electron Cyclotron Resonance. For example, it has been shown that a Co—Cr alloy thin film is manufactured by means of the ECR sputtering method. In this case, the composition segregation structure, in which the Co—Cr film is separated into an area containing a large amount of Co element and an area containing a large amount of Cr element, is formed in an advanced manner at a low substrate temperature as compared with the case in which the conventional sputtering method or the vacuum vapor deposition method is used. Thus, a medium having high coercivity is successfully manufactured. Further, it has been reported that a high orientation film, in which the film thickness is thin and the crystallinity is satisfactory, is obtained when oxide such as MgO is manufactured by means of the ECR sputtering method even when the film is formed at a low substrate temperature as compared with the conventional film formation method (The Institute of Electronics, Information and Communication Engineers, Technical Report of IEICE MR 2000-101 (January 2001), pp. 7–12).

In order to realize the high density recording in the magnetic recording, it is also important to reduce the medium noise. The major cause of the medium noise results from the zigzag domain wall generated in the transition area portion as the bit boundary. The larger the magnetic interaction between the magnetic grains is, the larger the extent of fluctuation of the zigzag domain wall is. Therefore, in order to reduce the medium noise, it is necessary to break the magnetic interaction acting between the crystal grains so that the magnetic crystal grains are magnetically isolated from each other.

In the case of the Co—Cr-based alloy having been hitherto used for the recording layer of the magnetic recording medium, Cr is segregated at the crystal grain boundary to form a non-magnetic layer. Therefore, the magnetic interaction acting between the crystal grains has been broken thereby (for example, see N. Inaba et al., J. Magn. Magn. Mater., vol. 168 (1997) pp. 222–231). However, when the $L1_0$ type ordered alloy is used for the magnetic recording layer, no composition segregation phase appears. Therefore, a problem arises such that the magnetic interaction between the magnetic grains cannot be broken and the medium noise is increased, when the magnetic recording layer is formed with only the $L1_0$ type ordered alloy.

In order to solve this problem, for example, the following fact has been reported in A. Kikitsu et al., J. Appl. Phys., vol. 87 (2000) pp. 6944–6946. That is, the magnetic interaction can be reduced by constituting a magnetic recording layer with a CoPt—$SiO_2$ granular film to separate $L1_0$ type ordered alloy crystal grains with oxide. However, in order to sufficiently separate the magnetic grains on the basis of the method as described above, it is necessary that the volume fraction of the oxide is not less than about 40%. The thickness of the oxide for the separation of the magnetic grains is about 5 nm. The thickness of the magnetic grain separation layer based on the oxide is consequently contrary to the viewpoint of the high density recording. It has been necessary to form a thinner layer.

In order to successfully reduce the medium noise, it is known that the grain diameters of the magnetic crystal grains for constituting the magnetic recording medium are decreased, and the fluctuation of the domain wall in the transition area is decreased. For example, when the areal recording density is a recording density of not less than 50 $Gb/cm^2$, it is estimated that the bit length of the recording bit is not more than 40 nm. The magnetic recording layer of the in-plane magnetic recording medium, which is generally used at present, has a crystal grain diameter of about 15 nm. In view of this fact, in order to constitute the bit length of 40 nm with the crystal grain diameter in the present circumstances, two or three crystal grains are aligned in the bit direction, and the zigzag domain wall is increased in the transition area. Accordingly, it is necessary to decrease the crystal grain diameter and increase the number of crystal grains in the bit length direction for constituting 1 bit. When it is intended to realize the high density recording, the following problems arise. That is, it is necessary that the film thickness of the magnetic film as the magnetic recording layer is made thin, the grain diameter of each of the magnetic crystal grains is made fine and minute, and the high coercivity is maintained in this state.

Especially, in the in-plane magnetic recording system, the influence of the demagnetizing field is large as described above. Therefore, the higher the recording density is, i.e., the shorter the bit length is, the more necessary the following measure is. That is, it is required that the film thickness of the magnetic recording layer is made thin and the influence of the demagnetizing field is reduced. Therefore, in the case of the medium for the in-plane magnetic recording, when the crystal grain diameter of the magnetic recording layer is made fine and minute, it is necessary that the influence, which is exerted by the shape magnetic anisotropy to direct the magnetization in the direction perpendicular to the film surface, is reduced by thinning the film thickness of the crystal grains to be not more than an extent approximately equivalent to the grain diameter. On the other hand, in the case of the medium for the perpendicular magnetic recording, the magnetic pole is generated on the surface of the magnetic recording layer, and the demagnetizing field is generated in the recording bit by the magnetic pole. The demagnetizing field always acts to reverse the recording magnetization. Therefore, if the magnetic anisotropy is small, then the magnetization reversal partially takes place, and any reverse magnetic domain is formed. The reverse magnetic domain causes the medium noise. Therefore, it is necessary to use, as the magnetic recording layer, a magnetic substance having high magnetic anisotropy in which the reverse magnetic domain scarcely appears.

Further, in the case of the two-layered perpendicular magnetic recording medium, the medium noise is caused by a back layer for returning the magnetic flux, in addition to the medium noise caused by the magnetic recording layer described above. The medium noise, which is caused by the back layer for returning the magnetic flux, includes the spike noise. This noise is caused such that the change of the magnetic flux, which is generated by any sudden movement of the domain wall generated in the back layer, is detected by the magnetic head. The soft magnetic material, which is used for the back layer, is roughly classified into the following three groups depending on the crystallinity. The first group includes the crystalline soft magnetic substance such as permalloy (Fe—Ni) and Fe—Al—Si, the second group includes the microcrystalline deposition type soft magnetic substance such as Fe—Ta—C and Fe—Ta—N, and the third group includes the amorphous soft magnetic substance such as Fe—Nb—Zr and Fe—Ta—Zr.

It has been reported that the spike noise is large in the case of the two-layered perpendicular magnetic recording medium in which the CoCr-based alloy is used for the magnetic recording layer and the crystalline soft magnetic substance such as permalloy is used for the back layer, while the spike noise is scarcely caused and the noise level of the medium is low in the case of the medium in which the microcrystalline deposition type soft magnetic substance such as Fe—Ta—C or the amorphous soft magnetic substance such as Fe—Nb—Zr is used for the back layer (document of the 10th ASET Symposium of the Association of Super-Advanced Electronics Technologies of the New Energy and Industrial Technology Development Organization of the Ministry of Economy, Trade and Industry (Apr. 25, 2001)).

In order to realize the high density recording, it is conceived that a two-layered perpendicular magnetic recording medium is constructed by using the ordered alloy described above as a magnetic recording layer. In this case, a problem arises such that it is impossible to sufficiently reduce the medium noise even when the back layer, which is used for the two-layered perpendicular magnetic recording medium based on the CoCr system, is applied as it is.

The present invention has been made in order to dissolve the drawbacks involved in the conventional technique. A first object of the present invention is to provide a magnetic recording medium which makes it possible to reduce the spike noise while enhancing the crystalline orientation of a magnetic recording layer composed of an ordered alloy, and a magnetic recording apparatus which is provided with the same.

A second object of the present invention is to provide a magnetic recording medium which makes it possible to reliably form fine and minute recording bits by enhancing the crystalline orientation of a magnetic recording layer composed of an ordered alloy, and a magnetic recording apparatus which is provided with the same.

A third object of the present invention is to provide a magnetic recording medium in which magnetic grains for constituting a magnetic recording layer have fine and minute crystal grain diameters, the grain diameter distribution thereof is successfully uniformized, the resistance against the thermal fluctuation is strong, and the recording demagnetization is small.

A fourth object of the present invention is to provide a magnetic recording medium in which the magnetic interaction between magnetic grains is reduced and the medium noise is small.

A fifth object of the present invention is to provide a method for producing a magnetic recording medium in which an $L1_0$ ordered alloy having high magnetic anisotropy is formed as a magnetic recording layer on an industrially usable substrate such as a glass substrate.

SUMMARY OF THE INVENTION

According to a first aspect of the present invention, there is provided a magnetic recording medium comprising:
a substrate; and
a magnetic recording layer which is formed on the substrate and composed of an ordered alloy,
wherein the ordered alloy has an $L1_0$ type crystalline structure containing at least one transition metal element of Co and Fe and at least one noble metal element of Pt and Pd, and further contains B.

The magnetic recording medium according to the first aspect of the present invention comprises the magnetic recording layer which is composed of the ordered alloy containing B (boron) and which is formed on the substrate containing the amorphous component, for example, a glass substrate. In the case of the ordered alloy, the temperature, at which magnetic grains thereof are ordered, is high. Therefore, when the ordered alloy is used for the recording layer of the magnetic recording medium, it has been necessary in ordinary cases that a substrate, which is capable of enduring the heating at a high temperature, for example, a silicon substrate is used, an ordered alloy material is formed on such a substrate, and the ordered alloy is formed by performing, for example, the heating treatment. However, the substrate such as the silicon substrate, which is formed of a high melting temperature material, is not suitable for the mass production of the information-recording media, because the cost is expensive. The present inventors have succeeded in forming a film of the magnetic recording layer composed of the ordered alloy at a temperature lower than those having been hitherto used, by allowing the ordered alloy to contain B. Therefore, according to the present invention, it is possible to obtain the magnetic recording medium comprising the magnetic recording layer composed of the ordered alloy on the glass substrate which is suitable for the mass production.

In the magnetic recording medium of the present invention, for example, an alloy, which is composed of a transition metal element and a noble metal element, can be used as the ordered alloy for the magnetic recording layer. In this case, it is desirable that B is contained within a range of 5 atomic % to 30 atomic %, and more preferably 5 atomic % to 20 atomic % in the main phase of the alloy composed of the transition metal element and the noble metal element. Further, at least one of Si and Al may be contained in the magnetic recording layer. When B is contained in the ordered alloy within the range as described above, then B is segregated to constitute the crystal grain boundary, and it is possible to break the magnetic interaction between the crystal grains. Accordingly, the magnetic crystal grains are magnetically isolated from each other. Therefore, it is possible to reduce the fluctuation of the zigzag domain wall formed in the magnetic recording layer, and it is possible to reduce the medium noise. Especially, B in the ordered alloy for constituting the magnetic recording layer also has such an effect that it is possible to lower the temperature of the substrate when the magnetic recording layer is formed.

In the present invention, the substrate, which contains the amorphous component, means the substrate which includes the amorphous component at least at the surface portion for forming the magnetic recording layer or the like, and it resides in the concept that includes not only the substrate in which the entire substrate is composed of a material containing the amorphous component but also the substrate in which a base portion is composed of a crystalline material and a surface portion thereof is formed of a material containing the amorphous component. Those usable as such a substrate include, for example, substrates made of glass, substrates made of ceramics, substrates made of carbon, and substrates in which a base portion is formed of, for example, metal, glass, or ceramics and an amorphous layer composed of, for example, NiP is formed on the surface. Among the substrates as described above, the glass substrate, which makes it possible to perform the mass production, is most suitable.

It is preferable that a relationship of C3<C4 is satisfied provided that C3 represents a concentration of B in the magnetic crystal grains for constituting the magnetic recording layer and C4 represents a concentration of B in the crystal grain boundary. When B is distributed in the magnetic recording layer as described above, then B as a non-magnetic element is excluded from the inside of the magnetic crystal grain to the crystal grain boundary, and the concentration of the non-magnetic element is increased in the crystal grain boundary. As a result, the ferromagnetic element is decreased in the crystal grain boundary, and the magnetic interaction, which acts between the magnetic crystal grains, is reduced. Thus, it is possible to reduce the medium noise. Further, when a relationship of (C5/10)<C6 is satisfied by a content (C5) of oxygen in the magnetic crystal grains for constituting the magnetic recording layer and a content (C6) of oxygen in the crystal grain boundary, an oxide phase is formed in the crystal grain boundary. Therefore, an effect is obtained such that the magnetic interaction between the crystal grains is reduced and the medium noise is reduced. Especially, in the case of C3<C4, the medium noise can be further reduced in addition to the effect to reduce the medium noise brought about by the effect of segregation of B owing to the formation of the oxide phase containing B in the crystal grain boundary in addition to the effect of the segregation of non-magnetic B in the crystal grain boundary. On the other hand, if oxygen in the crystal grains is increased while exceeding the relational expression described above, it is feared that the oxidizing action may be advanced also in the crystal grains to cause any deterioration of magnetic characteristics.

It is preferable that the magnetic recording layer of the magnetic recording medium of the present invention further contains Cr. When the ordered alloy containing B is allowed to contain Cr, then Cr is segregated in the grain boundary, and a non-magnetic segregated phase is formed. Such a non-magnetic segregated phase further effectively reduces the magnetic interaction acting between the crystal grains. Therefore, the magnetic isolation is facilitated for the magnetic grains, and it is possible to further reduce the medium noise. In the present invention, it is preferable that the total concentration of the concentration of B and the concentration of Cr contained in the magnetic recording layer is not more than 30 atomic %. If the total concentration exceeds the foregoing range, then the thickness of the non-magnetic segregated phase is increased, and the magnetic separation between the crystal grains is facilitated. However, such a total concentration exceeding the foregoing range is not preferred in view of the high density recording. It is preferable that the concentration of Cr in the magnetic recording layer is within a range of 5 atomic % to 25 atomic %. If the concentration of Cr in the magnetic recording layer is lower than 5 atomic %, then it is feared that it is impossible to sufficiently segregate the Cr element in the grain boundary, and it is feared that it is impossible to obtain any sufficient effect to reduce the magnetic interaction between the magnetic crystal grains brought about by the non-magnetic segregated phase. On the other hand, if the concentration of Cr exceeds 25 atomic %, then the Cr element is not only segregated in the crystal grain boundary, but also the Cr element is contained in the magnetic crystal grains in a large amount. As a result, it is feared that the magnetic characteristics of the magnetic crystal grains may be deteriorated by the Cr element contained in the magnetic crystal grains. In the present invention, it is preferable that the concentration of Cr in the magnetic crystal grains is higher than the concentration of Cr in the crystal grain boundary. When the foregoing relationship is satisfied for the concentrations of Cr element in the magnetic crystal grains and the crystal grain boundary, then the Cr element is further segregated in the crystal grain boundary in addition to the third element, and thus the non-magnetic segregated phase is formed.

In the present invention, the ordered alloy resides in the concept which includes not only alloys which are composed of only the ordered alloy but also alloys in which the ratio occupied by the crystalline structure of the ordered, alloy is not less than 80% of the whole. Those preferably usable as the ordered alloy include, for example, ordered alloys exhibiting the $L1_0$ type crystalline structure and the face-centered cubic lattice structure. Those usable as the ordered alloy having the $L1_0$ type crystalline structure include, for example, FePt, CoPt, and FePd. Those usable as the ordered alloy having the face-centered cubic lattice structure include, for example, FePt alloy added with an appropriate amount of B as a third element. When the element, which has an atomic radius smaller than those of, for example, Fe and Pt and which enters the gap space of the crystal lattice, is added as the third element in an appropriate amount, the crystalline structure of the ordered alloy to serve as the base phase is changed from the $L1_0$ type crystalline structure (face-centered tetragonal lattice) to approximately the face-centered cubic lattice structure.

The magnetic recording medium according to the first aspect of the present invention may further comprise at least one layer of non-magnetic underlayer which is disposed between the magnetic recording layer and the substrate. In this arrangement, it is preferable that the non-magnetic underlayer, which contacts with the magnetic recording layer, has one of crystalline structures of a body-centered cubic lattice (bcc), a body-centered tetragonal lattice (bct), a face-centered cubic lattice (fcc), a face-centered tetragonal lattice (fct), and an NaCl type crystalline structure. When the non-magnetic underlayer has the crystalline structure of bcc, fcc, or NaCl type, it is preferable that a {100} crystal plane is parallel to the substrate surface. Alternatively, when the non-magnetic underlayer has the crystalline structure of bct or fct, it is preferable that a (100) crystal plane or a (001) crystal plane is parallel to the substrate. When the magnetic grains of the magnetic recording layer are epitaxially grown on the non-magnetic underlayer as described above, it is possible to enhance the crystalline orientation of the magnetic recording layer.

In the present invention, those usable as the non-magnetic underlayer having the bcc crystalline structure include a simple substance of Cr, V, Mo, W, Nb, Ta, or Hf, and an alloy obtained by adding at least one element selected from the group consisting of Cr, V, Mo, W, Nb, Ti, Ta, Ru, Zr, and Hf to at least one of the elements of Cr, V, Mo, W, Nb, Ta, and Hf. Those usable as the non-magnetic underlayer having the bct crystalline structure include a two-element alloy of Ni—Al and an alloy obtained by adding at least one element selected from the group consisting of V, Mo, W, Nb, Ti, Ta, Ru, Zr, and Hf to the two-element alloy of Ni—Al. Those usable as the non-magnetic underlayer having the fcc crystalline structure include a material containing at least one selected from the group consisting of Pt, Pd, Rh, Au, Ag, and Cu. Those usable as the non-magnetic underlayer having the NaCl crystalline structure include a material containing at least one selected from the group consisting of MgO, LiF, and NiO.

It is preferable for the magnetic recording medium according to the first aspect of the present invention that a relationship of C1>C2 is satisfied provided that C1 represents a concentration of the transition metal element in the magnetic crystal grains for constituting the magnetic recording layer and C2 represents a concentration of the transition metal element in the crystal grain boundary. Accordingly, the amount of the ferromagnetic element in the crystal grains is relatively increased, the magnetic characteristics of the individual crystal grains are improved, and the amount of the ferromagnetic element in the crystal grain boundary is decreased. Therefore, it is possible to reduce the magnetic interaction acting between the crystal grains, and it is possible to reduce the medium noise.

In the magnetic recording medium according to the first aspect of the present invention, it is preferable that the magnetic grains for constituting the magnetic recording layer have an average crystal grain diameter within a range of 4 nm to 10 nm. Further, it is preferable that a relationship of (2×d1)>d2 is satisfied provided that d2 represents a grain diameter of a minimum unit of magnetization reversal upon the AC erasing for the magnetic recording layer (when the magnetic recording layer is initialized by means of the alternate current demagnetization). Accordingly, it is possible to exclude a phenomenon in which a plurality of adjoining crystal grains simultaneously cause the magnetization reversal, i.e., a phenomenon in which a wide area of the magnetic recording layer causes the magnetization reversal at once, when a magnetic field is applied to the magnetic recording layer by using a magnetic head. The magnetization reversal occurs in each of the individual crystal grains. Thus, it is possible to decrease the zigzag domain wall in the magnetization transition area, and it is possible to reduce the medium noise.

The magnetic recording medium according to the first aspect of the present invention may further comprise a back layer which is formed of a soft magnetic material. The back layer may be constructed by using at least two types of soft magnetic layers having different crystalline forms, for example, a microcrystalline deposition type soft magnetic layer and a crystalline soft magnetic layer, for example, as in a magnetic recording medium according to a second aspect as described later on. Accordingly, it is possible to sufficiently reduce the medium noise on the magnetic recording medium.

According to a second aspect of the present invention, there is provided a magnetic recording medium comprising:
 a substrate;
 a magnetic recording layer which is composed of an ordered alloy; and
 a back layer, wherein:
 the back layer includes at least two types of soft magnetic layers having crystalline forms different from each other.

The magnetic recording medium according to the second aspect of the present invention is constructed by using, as the back layer, at least the two types of the soft magnetic layers having the crystalline forms different from each other, and thus the medium noise has been successfully reduced sufficiently on the magnetic recording medium which is based on the use of the ordered alloy as the magnetic recording layer. The reason therefor will be explained below.

In general, the ordered alloy has a high ordering temperature. Therefore, it is necessary to manufacture the magnetic recording medium by raising the substrate temperature as compared with the CoCr-based alloy. Therefore, if the conventional amorphous soft magnetic substance is used for the back layer, then the amorphous soft magnetic layer is crystallized during the process for forming the magnetic recording layer, and the characteristics are deteriorated. As a result, there is a high possibility of the generation of medium noise. On the other hand, when a microcrystalline deposition type soft magnetic substance is used for the back layer in place of the amorphous soft magnetic layer, the performance of the back layer is not deteriorated even when the magnetic recording layer composed of the ordered alloy is formed by means of a high temperature process, in view of the fact that it is necessary to perform the heat treatment in order to exhibit the characteristics of the material. However, it has been difficult to control the crystalline orientation of the magnetic recording layer to be formed on the back layer, resulting in the generation of medium noise, because the crystalline orientation on the uppermost surface is subjected to the random orientation in the case of the back layer having the microcrystalline deposition type. The crystalline soft magnetic film has such an advantage that it is easy to control the crystalline orientation of the magnetic recording layer to be formed thereon, because the crystalline orientation is satisfactory. However, the crystalline soft magnetic film has involved such a problem that the spike noise is generated. Further, when the crystalline soft magnetic substance is used for the back layer, the crystal grains of the crystalline soft magnetic substance are grown while being excessively increased in size due to the high temperature process during the formation of the magnetic recording layer composed of the ordered alloy. As a result, the domain wall in the soft magnetic substance tends to move, which has caused the increase of the spike noise.

In view of the above, in the magnetic recording medium according to the second aspect of the present invention, the back layer is constructed by using at least two types of the soft magnetic layers having the crystalline forms different from each other, for example, at least two types of layers of a microcrystalline deposition type soft magnetic layer and a crystalline soft magnetic layer. The back layer is constructed such that the crystalline soft magnetic layer is positioned on a side near to the magnetic recording layer in the back layer. When the crystalline soft magnetic layer is formed to have a predetermined thickness on the side near to the magnetic recording layer as described above, it is possible to avoid the occurrence of the spike noise by the aid of the microcrystalline deposition type soft magnetic layer while controlling the crystalline orientation of the magnetic recording layer. It is preferable that a relationship of t1>t2 is satisfied provided that t1 represents a film thickness of the microcrystalline deposition type soft magnetic layer and t2 represents a film thickness of the crystalline soft magnetic layer.

In the magnetic recording medium according to the second aspect of the present invention, it is preferable that a non-magnetic layer is provided between the back layer and the magnetic recording layer, in order to control the crystalline orientation of the magnetic recording layer more accurately. In this arrangement, it is preferable that the non-magnetic layer is epitaxially grown from the crystalline soft magnetic layer for constituting the back layer, and the magnetic recording layer is epitaxially grown from the non-magnetic layer. When the non-magnetic layer and the magnetic recording layer are epitaxially grown from the crystalline soft magnetic layer as described above, it is possible to grow the magnetic grains having the desired grain diameters and the desired crystalline orientation in the magnetic recording layer. Therefore, it is possible to make the crystal grain diameters in the magnetic recording layer to be fine and minute, and it is possible to reduce the dispersion of the grain diameters. Thus, it is possible to decrease the medium noise and the thermal fluctuation of the magnetic recording medium. Further, it is possible to remarkably reduce the medium noise, because the area of magnetization reversal in the magnetic recording layer is prevented from formation of any zigzag form.

It is preferable that the non-magnetic layer, which is formed between the back layer and the magnetic recording layer, has any one of crystalline structures of a body-centered cubic lattice (bcc), a body-centered tetragonal lattice (bct), a face-centered cubic lattice (fcc), a face-centered tetragonal lattice (fct), and an NaCl type crystalline structure. It is more preferable that a (001) crystal plane is substantially parallel to the substrate. Accordingly, it is possible to enhance the crystalline orientation of the magnetic recording layer to be formed on the non-magnetic layer.

As for the non-magnetic layer having the bcc crystalline structure, for example, it is possible to use a simple substance of Cr, V, Mo, W, Nb, Ta, or Hf, or an alloy obtained by adding at least one element selected from the group consisting of Cr, V, Mo, W, Nb, Ti, Ta, Ru, Zr, and Hf to at least one of the elements of Cr, V, Mo, W, Nb, Ta, and Hf. As for the non-magnetic layer having the bcc crystalline structure, for example, it is possible to use a two-element alloy of Ni—Al or an alloy obtained by adding at least one element selected from the group consisting of V, Mo, W, Nb, Ti, Ta, Ru, Zr, and Hf to the two-element alloy of Ni—Al. As for the non-magnetic layer having the fcc crystalline structure, for example, it is possible to use a simple substance of Pt, Pd, Rh, Au, Cu, or Ag, or an alloy having a main phase composed of at least one of them. As for the non-magnetic layer having the NaCl crystalline structure, for example, it is possible to use an inorganic substance containing at least one of MgO, LiF, and NiO.

In the present invention, it is preferable to use, as the ordered alloy, for example, an ordered alloy which exhibits an $L1_0$ type crystalline structure or a face-centered cubic lattice structure. It is possible to use, for example, FePt, CoPt, and FePd for the ordered alloy having the $L1_0$ type crystalline structure. It is possible to use, for example, an FePt alloy obtained by adding an appropriate amount of a third element of B for the ordered alloy exhibiting the face-centered cubic lattice structure. When the element, which has an atomic radius smaller than those of, for example, Fe and Pt and which enters the gap space of the crystal lattice, is added in an appropriate amount as the third element, the ordered alloy, which serves as the base phase, undergoes the change of the crystalline structure from the $L1_0$ type crystalline structure (face-centered tetragonal lattice) approximately to the face-centered cubic lattice structure.

In the present invention, the term "soft magnetic substance" resides in the concept which includes the magnetic substance having the coercivity that is not more than 1/10 of the coercivity of the recording layer.

In the magnetic recording medium of the present invention, the microcrystalline deposition type soft magnetic layer may be composed of, for example, an Fe—X—C alloy or an Fe—X—N alloy (X=Ta, Ti, Zr, Hf, V, Nb). When the microcrystalline deposition type soft magnetic layer is composed of the Fe—X—C alloy, it is possible to provide a structure in which a phase principally composed of Fe and a phase principally composed of X—C are deposited. Further, it is preferable that an average crystal grain diameter of a crystal grain diameter distribution of the phase principally composed of Fe is within a range of 7 nm to 20 nm. Further, it is preferable that an average crystal grain diameter of a crystal grain diameter distribution of the phase principally composed of X—C is within a range of 3 nm to 7 nm. Accordingly, the characteristics are improved. It is preferable that the crystalline soft magnetic substance has a crystalline structure of a body-centered cubic lattice or a face-centered cubic lattice. It is preferable that a {100} crystal plane is substantially parallel to the substrate. Accordingly, it is possible to enhance the crystalline orientation of the magnetic recording layer.

In the magnetic recording medium according to the second aspect of the present invention, it is preferable to control the orientation so that a direction of an easy axis of magnetization of the magnetic grains for constituting the magnetic recording layer is substantially perpendicular to a substrate surface.

When the $L1_0$ type ordered alloy is used for the magnetic recording layer, a major component of the crystal grains of the magnetic recording layer is composed of a transition metal element of Co or Fe and a noble metal element of Pt or Pd. In this case, it is preferable that an atomic ratio between the transition metal element and the noble metal element is as follows:

$0.45 \leq$ (transition metal element)/(transition metal element+noble metal element)$\leq 0.55$. When the range as described above is adopted, the crystalline structure of the alloy composed of the transition metal element and the noble metal element can be formed as a desired ordered structure. When any range except for the range as described above is adopted, then it is difficult to form the desired ordered structure, and hence it is feared that the desired magnetic characteristics cannot be obtained.

In the magnetic recording medium according to the second aspect of the present invention, it is preferable that the ordered alloy for constituting the magnetic recording layer contains at least one of B, Si, and Al as a third element. It is especially preferable that the ordered alloy contains B. When B is contained in the ordered alloy, then B is partially mixed into the crystal grains, and B is segregated to constitute the crystal grain boundary. Therefore, it is possible to break the magnetic interaction between the magnetic grains. Accordingly, it is possible to further reduce the medium noise. In order to form the magnetic recording layer composed of the ordered alloy, it is necessary to apply the heat to obtain a high temperature of about 600° C. after the film formation. However, when B is added to the ordered alloy, an effect is also obtained such that the temperature for the heating treatment is lowered during the heating treatment. It is preferable that the magnetic recording layer, which is composed of the ordered alloy, is formed by using an electron cyclotron resonance (ECR) sputtering method. When B is contained in the ordered alloy, it is possible to lower the temperature for heating the substrate during the film formation.

It is preferable that the ordered alloy, which forms the magnetic recording layer of the magnetic recording medium according to the second aspect of the present invention, contains Cr as a fourth element in addition to the third element described above. When Cr is contained as the fourth element, Cr is segregated in the crystal grain boundary to form a non-magnetic segregated phase. Accordingly, the magnetic interaction, which acts between the crystal grains, is further reduced. Thus, it is possible to further reduce the medium noise.

In the magnetic recording medium of the present invention, it is preferable that a relationship of C1>C2 is satisfied provided that C1 represents a concentration of the transition metal element in the magnetic grains for constituting the magnetic recording layer and C2 represents a concentration of the transition metal element in a grain boundary. It is preferable that a relationship of C3<C4 is satisfied provided that C3 represents a concentration of the third element in the magnetic grains and C4 represents a concentration of the third element in the grain boundary. When the concentrations of the third element in the magnetic crystal grains and the crystal grain boundary satisfy the relationship as described above, then the third element as the non-magnetic element is excluded from the inside of the crystal grains to the crystal grain boundary, and the concentration of the non-magnetic element is consequently increased in the crystal grain boundary. Further, when Cr is contained as the fourth element, it is preferable that the concentration of Cr in the magnetic crystal grains is made higher than the concentration of Cr in the crystal grain boundary. When the concentrations of the Cr element in the magnetic crystal grains and the crystal grain boundary satisfy the relationship as described above, then the Cr element is also segregated in the crystal grain boundary in addition to the third element, and the non-magnetic segregated phase is consequently formed. As a result, the ferromagnetic element is decreased in the crystal grain boundary, and the magnetic interaction between the crystal grains is reduced. Thus, it is possible to reduce the medium noise. Further, it is preferable that the magnetic recording layer is formed by using the electron cyclotron resonance (ECR) sputtering method. Accordingly, the characteristics are further improved.

According to a third aspect of the present invention, there is provided a method for producing a magnetic recording medium of the first aspect of the present invention, comprising:

providing a substrate; and heating the substrate, and then forming a magnetic recording layer by allowing particles having electric charge generated by forming a plasma of sputtering gas to collide with a target containing B so that target particles sputter, and depositing the target particles on the substrate.

In the production method of the present invention, the magnetic recording layer is formed, for example, by means of the ECR sputtering method by using the target containing B. Those usable as the target containing B include, for example, a target composed of a pellet of B which is stuck to a sputtering surface of the target formed of an ordered alloy for constituting the magnetic recording layer. Alternatively, it is possible to use a target composed of a target formed of only B and a target formed of an ordered alloy for constituting the magnetic recording layer. For example, the $L1_0$ type ordered alloy can be used as the ordered alloy. The magnetic recording layer formed as described above contains B in the ordered alloy. When B is contained in the ordered alloy, the ordering temperature is lowered. Therefore, it is possible to form the magnetic recording layer at the substrate temperature which is lower than those having been hitherto used. Accordingly, it is possible to use the substrate containing the amorphous component, for example, a glass substrate as the substrate for the magnetic recording medium. It is possible to produce the magnetic recording media based on the use of the ordered alloy containing B as the magnetic recording layer cheaply in a large amount.

In the production method of the present invention, it is preferable to use the electron cyclotron resonance (ECR) sputtering method as the method for forming the plasma of the sputtering gas. Accordingly, it is possible to reduce the temperature for heating the substrate during the film formation of the magnetic recording layer in order to obtain the ordered alloy, for example, to be within a range of 400° C. to 550° C.

The production method of the present invention may further comprise performing a heating treatment for the magnetic recording layer after forming the magnetic recording layer. In order to order the ordered alloy containing B, the heating treatment may be performed at a temperature of not more than 550° C. In order to reliably order the alloy, the heating treatment may be preferably performed at a temperature of not less than 450° C.

According to a fourth aspect of the present invention, there is provided a magnetic recording apparatus comprising:

the magnetic recording medium according to the first aspect or the second aspect of the present invention;

a magnetic head which is used to record or reproduce information; and a drive unit which is used to drive the magnetic recording medium with respect to the magnetic head.

The magnetic recording apparatus as described above is based on the use of the magnetic recording medium according to the first aspect or the second aspect of the present invention. Therefore, the magnetic recording apparatus is highly resistant to the thermal fluctuation and the thermal demagnetization. Further, the magnetic recording apparatus is excellent in thermal stability. It is possible to reproduce, at a low medium noise level, the information recorded at a high density in the magnetic recording layer of the magnetic recording medium.

According to a fifth aspect of the present invention, there is provided a method for producing a magnetic material containing an ordered alloy, the method comprising forming the ordered alloy by means of a method selected from the group consisting of a gas phase method, a melting method, and a sintering method after allowing a component for constituting the ordered alloy to contain B or while allowing the component for constituting the ordered alloy to contain B. According to the production method as described above, it is possible to lower the temperature at which the component for constituting the ordered alloy is ordered. When the gas phase method is used, for example, B and the component for constituting the ordered alloy may be mutually vaporized so that B is contained in the component for constituting the ordered alloy on the substrate. Specifically, it is possible to use the CVD method, the vacuum vapor deposition method, the MBE method, the sputtering method, and the ion beam method. When the melting method is used, B and the component for constituting the ordered alloy may be mixed and melted, or B and the component for constituting the ordered alloy may be mixed with each other after being melted, followed by being cooled to obtain a desired shape and effect solidification. When the sintering method is used, for example, a predetermined amount of powder composed of the component for constituting the ordered alloy and a predetermined amount of powder composed of B may be mixed with each other, and they are compressed and formed into a desired shape, followed by being sintered at a predetermined temperature. The content of B to be contained in the component for constituting the ordered alloy is appropriately selectable depending on, for example, the type and the way of use of the magnetic material to be produced. For example, when the magnetic material is used for the magnetic layer of the magnetic recording medium, it is possible to make selection so that the content of B in the recording layer is 5 atomic % to 20 atomic %.

The magnetic material, which is most appropriately produced by using the production method of the present invention, is exemplified, for example, by magnetic fluids, permanent magnets, and thin film magnets to be used for subminiature motors and micromachines.

When a magnetic fluid is produced as the magnetic material, for example, a target, which includes a pellet composed of B attached to a target formed of the ordered alloy, may be used, or a target composed of B and a target composed of the ordered alloy may be used so that fine particles of the ordered alloy containing B are deposited into the fluid such as a surfactant, a lubricant, or an oil by means of the sputtering method such as the DC sputtering, the RF sputtering, and the ECR sputtering. The ordering temperature of the ordered alloy is lowered owing to B contained in the ordered alloy. Therefore, the fine particles of the ordered alloy containing B can be deposited into the fluid only by heating the fluid as the deposition objective to the lowered ordering temperature during the sputtering. Accordingly, the magnetic fine particles or grains composed of the ordered alloy containing B are successfully allowed to exist in the fluid. Other than the sputtering method, for example, it is also possible to use the vacuum vapor deposition method.

DESCRIPTION OF THE PREFERRED EMBODIMENTS OF THE INVENTION

Figure 1:
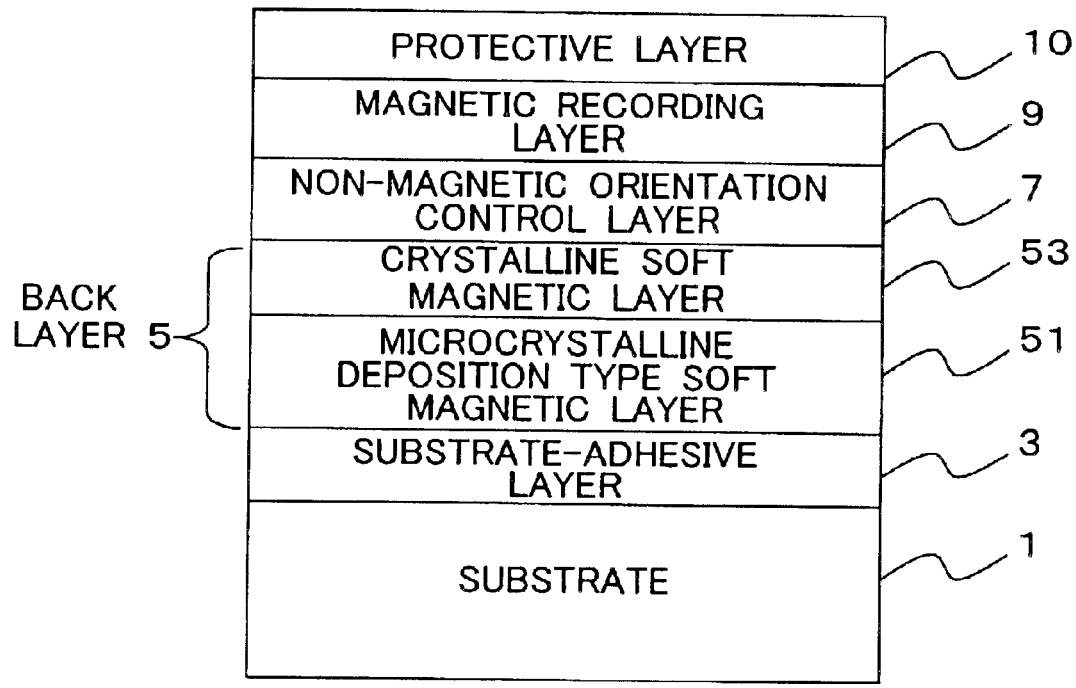
FIG. 1 shows a schematic sectional view illustrating a magnetic recording medium according to the present invention manufactured in Example 1.

Examples of the present invention will be explained in detail below with reference to the drawings. Those affixed with identical reference numerals in the drawings used in the following explanation indicate parts or portions having identical functions.

EXAMPLE 1

FIG. 1 shows a schematic sectional view illustrating a magnetic recording medium according to the present invention. The magnetic recording medium comprises, on a substrate 1, a substrate-adhesive layer 3, a back layer 5, a non-magnetic orientation control layer 7, a magnetic recording layer 9, and a protective layer 10. The back layer 5 is composed of a microcrystalline deposition type soft magnetic layer 51 and a crystalline soft magnetic layer 53. The crystalline soft magnetic layer 53 is formed on the side of the magnetic recording layer 9. In Example 1, Fe—Ta—C was used for the microcrystalline deposition type soft magnetic layer 51, and permalloy was used for the crystalline soft magnetic layer 53. However, there is no limitation thereto. A microcrystalline deposition type soft magnetic material such as Fe—Ta—N may be used for the microcrystalline deposition type soft magnetic layer 51 in place of Fe—Ta—C, and a crystalline soft magnetic material such as Fe—Al—Si may be used for the crystalline soft magnetic layer 53 in place of permalloy.

In Example 1, a CoPt ordered alloy was used for the magnetic recording layer. However, there is no limitation thereto. Fe may be used in place of Co, and Pd may be used in place of Pt.

The method described in this embodiment is the representative film formation method, unless otherwise specified and explained for the reason for the film formation method for the metal film or the conductive film In Example 1. When the metal film or the conductive film is formed, the DC magnetron sputtering method, the RF magnetron sputtering method, the RF conventional sputtering method, and the ECR sputtering method may be used. When the non-metal film or the non-conductive film is formed, the RF magnetron sputtering method, the RF conventional sputtering method, and the ECR sputtering method may be used. For example, the vacuum vapor deposition method and/or the ion beam sputtering method may be used other than the sputtering method provided that the characteristics of the formed film are not deteriorated.

An explanation will be made below about a method for producing the magnetic recording medium having the stacked or laminated structure shown in FIG. 1.

At first, a washed glass substrate for the magnetic disk having a diameter of 2.5 inches (about 6.35 cm) was installed to a sputtering film formation apparatus. Evacuation was previously performed in an introducing chamber up to a vacuum degree of less than $1\times10^{-7}$ Torr, and then the substrate was heated to 200° C. to remove any adsorption gas on the substrate surface. Hf was formed as the substrate-adhesive layer 3 in a thickness of 15 nm. When the film of Hf was formed, the DC magnetron sputtering method was used. The Ar gas pressure was 3 mTorr, and the applied electric power was set so that the film formation rate was 5 nm/second. It is also possible to form the back layer 5 directly on the substrate 1. However, in the case of such a procedure, there is a high possibility that the initial growth state of the back layer may be changed depending on the surface state of the substrate. Therefore, the substrate-adhesive layer 3 is provided in order to prevent the back layer from being affected by the substrate surface so that the back layer can be always formed on the surface in an identical state.

In Example 1, Hf was used for the substrate-adhesive layer 3. However, there is no limitation thereto. Any element is available provided that the element has a high melting point so that crystal grains of the formed film are fine and minute. It is also allowable to use pure metals such as W, Ta, Ti, Zr, and Mo or alloys having main phases composed of such elements. In Example 1, the film thickness is 15 nm. However, the film thickness may be within a range of 3 nm to 50 nm. If the film thickness is thinner than 3 nm, it is feared that the substrate-adhesive layer is not formed uniformly to generate any portion in which the film thickness is thin. Therefore, it is feared that there may be any portion at which the influence of the substrate cannot be broken. On the other hand, if the film thickness is made thicker than 50 nm, the irregularity of the film surface is increased, because crystal grains are grown to be large. It is feared that the characteristics of the back layer to be formed thereon may be deteriorated.

In the next step, the back layer 5, which was composed of the microcrystalline deposition type soft magnetic layer 51 and the crystalline soft magnetic layer 53, was formed on Hf as the substrate-adhesive layer 3. At first, a film of Fe-9 atomic % Ta-12 atomic % C (film thickness: 200 nm) was formed as the microcrystalline deposition type soft magnetic layer 51 by using the RF magnetron sputtering method. The film formation condition was as follows. That is, the Ar gas pressure was 3 mTorr, and the applied electric power was controlled so that the film formation rate was 1.5 nm/second. Subsequently, permalloy (Ni-20 atomic % Fe, film thickness: 50 nm) was directly formed as the crystalline soft magnetic layer 53 on the Fe—Ta—C film by using the ECR sputtering method. The film formation condition was as follows. That is, the gas pressure was 0.2 mTorr, the microwave for exciting the plasma was 700 W, and the applied electric power was controlled so that the film formation rate was 0.2 nm/second, as for the electric power to be applied to the target. The entire film thickness of the back layer 5 is appropriately within a range in which the entire film thickness is not less than three times the film thickness of the magnetic recording layer and the entire film thickness is not more than 500 nm. If the film thickness of the back layer is thinner than the film thickness which is three times the film thickness of the magnetic recording layer, then the magnetic field applied from the head leaks from the back layer, and the writing ability of the head is deteriorated. On the other hand, if the film thickness of the back layer is thicker than 500 nm, the surface irregularity of the back layer is increased. As a result, the flatness of the magnetic recording layer to be formed on the back layer is affected thereby. It is difficult to maintain a constant distance between the head and the medium surface when the head is allowed to float over the medium. It is feared that the recording and reproduction characteristics may be deteriorated.

In Example 1, the crystalline soft magnetic layer 53 was formed directly on the microcrystalline deposition type soft magnetic layer 51. However, a non-magnetic layer may be allowed to intervene therebetween. In this arrangement, it is desirable that the film thickness of the non-magnetic layer is thinner than the film thickness of the non-magnetic orientation control layer 7 formed between the back layer 5 and the magnetic recording layer 9. Accordingly, the magnetic flux from the magnetic head, which arrives at the back layer 5, is prevented from leakage from the non-magnetic layer. The characteristics of the back layer 5 are prevented from deterioration. Therefore, an equivalent effect is obtained in any of the case in which the crystalline soft magnetic layer 53 is formed directly on the microcrystalline deposition type soft magnetic layer 51 and the case in which the crystalline soft magnetic layer 53 is formed on the microcrystalline deposition type soft magnetic layer 51 with the non-magnetic layer intervening therebetween.

In the next step, a film of MgO (5 nm) was formed as the non-magnetic orientation control layer 7 on the back layer 5. The film of MgO was formed by using the RF conventional sputtering method. The Ar gas pressure was 3 mTorr during the film formation, and the applied electric power was adjusted so that the film formation rate was 0.1 nm/second. In this procedure, the MgO film was used as the non-magnetic orientation control layer 7. However, it is also possible to use a simple substance of Cr, V, Mo, W, Nb, Ta, or Hf having the bcc crystalline structure, or an alloy obtained by adding at least one element selected from the group consisting of Cr, V, Mo, W, Nb, Ti, Ta, Ru, Zr, and Hf to at least one of the elements of Cr, V, Mo, W, Nb, Ta, and Hf. Alternatively, it is also possible to use a material having the bct crystalline structure, for example, an Ni—Al two-element alloy, or an alloy obtained by adding at least one or more elements selected from the group consisting of V, Mo, W, Nb, Ti, Ta, Ru, Zr, and Hf to the Ni—Al two-element alloy. Further alternatively, it is also possible to use a non-magnetic metal having the fcc crystalline structure containing at least one of Pt, Pd, Rh, Au, Cu, and Ag. Further alternatively, it is also allowable to use an inorganic substance having the NaCl crystalline structure containing at least one of LiF and NiO.

After the film formation of the non-magnetic orientation control layer 7, the substrate was heated to 400° C. to form the magnetic recording layer 9 (film thickness: 15 nm). The magnetic recording layer 9 was formed by using the ECR sputtering method. A mixed gas, which was obtained by adding $O_2$ gas in an amount of 1% to Ar gas, was used for the film formation. The magnetic film was formed by means of the reactive sputtering method. The film formation condition was as follows. That is, the gas pressure was 0.2 mTorr, the microwave for exciting the plasma was 700 W, and the electric power applied to the target was RF 1 kW. On this condition, the film formation rate was 0.2 nm/second. A target, which was obtained by adding 10 atomic % B to a base of Co-53 atomic % Pt, was used. The composition of the magnetic recording layer in a thin film state after the film formation was determined by previously preparing a single layer film and using the ICPS method (Inductively Coupled Plasma Spectroscopy). As a result, the average composition of the film was Co-47 atomic % Pt-9 atomic % B.

A carbon film (film thickness: 5 nm) was formed as the protective layer 10 at a point of time at which the substrate temperature was lowered to about 100° C. after the formation of the magnetic recording layer 9. The carbon film was formed by using the DC magnetron sputtering method. The film formation condition was as follows. That is, the Ar gas pressure was 2 mTorr, and the electric power applied to the target was 0.3 kW. The reason, why the substrate temperature was lowered when the carbon film was formed, is as follows. That is, if the carbon film is formed while maintaining a state in which the substrate temperature is a high temperature, there is such a possibility that the carbon film may be diffused to the magnetic recording layer disposed thereunder resulting in any change of the characteristics of the magnetic recording layer. Therefore, it was intended to avoid such an inconvenience. Samples, with which the recording and reproduction characteristics were evaluated, were previously subjected to tape varnish, and then a lubricant was applied thereto. Each of the manufactured sample media was cut out into small pieces to evaluate the film structure and the magnetic characteristics after performing the evaluation of the recording and reproduction characteristics as described later on.

COMPARATIVE EXAMPLE 1

Figure 2:
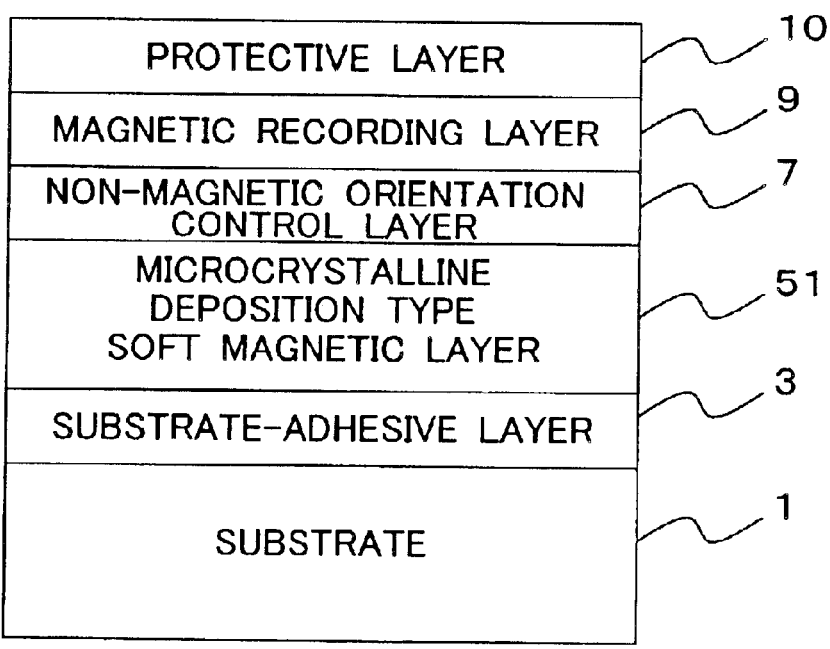
FIG. 2 shows a schematic sectional view illustrating a conventional magnetic recording medium manufactured in Comparative Example 1.

FIG. 2 shows a schematic sectional view illustrating a magnetic recording medium of Comparative Example 1. The magnetic recording medium of Comparative Example 1 was manufactured in the same manner as in Example 1 except that the back layer 5 of the magnetic recording medium of Example 1 was replaced with a conventional microcrystalline deposition type soft magnetic substance single layer (film thickness: 250 nm).

COMPARATIVE EXAMPLE 2

Figure 3:
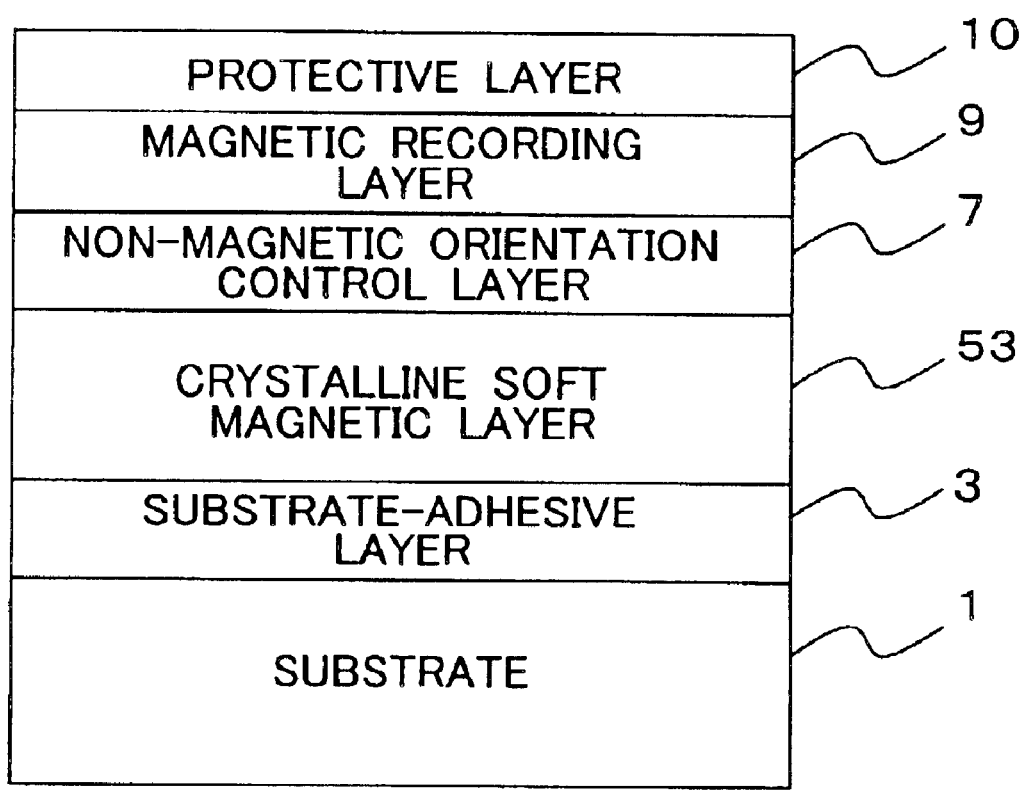
FIG. 3 shows a schematic sectional view illustrating a conventional magnetic recording medium manufactured in Comparative Example 2.

FIG. 3 shows a schematic sectional view illustrating a magnetic recording medium manufactured in Comparative Example 2. The magnetic recording medium of Comparative Example 2 was manufactured in accordance with the same method as that used in Example 1 except that the back layer 5 of the magnetic recording medium of Example 1 was replaced with a conventional crystalline soft magnetic substance single layer. An explanation will be made below about a method for manufacturing the magnetic recording medium of Comparative Example 2 shown in FIG. 3

At first, a washed glass substrate for the magnetic disk having a diameter of 2.5 inches was installed to a sputtering film formation apparatus. Evacuation was previously performed in an introducing chamber up to a vacuum degree of less than $1 \times 10^{-7}$ Torr, and then the substrate was heated to 200° C. to remove any adsorption gas on the substrate surface. MgO was formed as the substrate-adhesive layer 3 to have a thickness of 25 nm. When the film of MgO was formed, the RF conventional sputtering method was used. The Ar gas pressure was 3 mTorr, and the applied electric power was set so that the film formation rate was 0.1 nm/second.

A film of permalloy Ni-20 atomic % Fe (film thickness: 250 nm) as the crystalline soft magnetic layer 53 was formed as the back layer 5 on MgO as the substrate-adhesive layer 3 by using the RF magnetron sputtering method. The film formation condition was as follows. That is, the Ar gas pressure was 3 mTorr, and the applied electric power was controlled so that the film formation rate was 1.5 nm/second.

The non-magnetic orientation control layer 7, the magnetic recording layer 9, and the protective layer 10 were formed in the same manner as in Example 1 after the formation of the crystalline soft magnetic layer 53.

Comparison of Characteristics

Magnetic characteristics of the magnetic recording layer were compared for the magnetic recording media of Example 1 and Comparative Examples 1 and 2. In this investigation, the rectangularity ratio S and the coercivity Hc of the magnetic recording layer in the direction perpendicular to the film surface (hereinafter referred to as "film surface-perpendicular direction") were determined by measuring the Kerr effect. Results of the measurement are shown below.

Sample of Example 1: Hc=3.5 kOe, S=0.98

Sample of Comparative Example 1: Hc=2.7 kOe, S=0.35

Sample of Comparative Example 2: Hc=2.2 kOe, S=0.99

X-ray Diffraction Measurement and Electron Microscopy

In order to investigate the microstructures of the samples for which the magnetic characteristics had been measured, the X-ray diffraction measurement and the electron microscopy were performed. When the X-ray diffraction measurement was performed for the sample of the present invention, the diffraction peak was observed from the magnetic recording layer as follows. That is, a diffraction peak was observed from the (002) plane in the vicinity of 2θ~48°. On the other hand, in the case of the sample of Comparative Example 1, diffraction peaks from the magnetic recording layer were observed in the vicinity of 2θ~41° and in the vicinity of 2θ~48°. Among these peaks, the former is the diffraction peak from the (111) plane, and the latter is the diffraction peak from the (002) plane. When the peak intensities of the both were compared with each other, the peak intensity of the latter is not more than 1/10 as compared with the peak intensity of the former. According to this result, it is appreciated that the magnetic recording layer of Comparative Example 1 is principally composed of the crystal grains subjected to the (111) plane orientation. Also in the case of the sample of Comparative Example 2, a diffraction peak from the (111) plane was observed in the vicinity of 2θ~41°, and a diffraction peak from the (002) plane was observed in the vicinity of 2θ~48°. However, unlike the case of Comparative Example 1, the peak intensity from the (111) plane was small, which was about 1/20 of the peak intensity from the (002) plane. According to the result of the X-ray diffraction measurement, it was revealed that the difference appeared in the crystalline orientation of the magnetic recording layer formed on the back layer depending on the difference in the structure of the back layer 5.

In order to clarify the relationship between the crystalline orientation of the magnetic recording layer and the structure of the back layer, the transmission electron microscope (TEM) observation was performed in the cross-sectional direction of each of the samples and in the direction parallel to the film surface of the magnetic recording layer (hereinafter referred to as "film in-plane direction"). In a TEM image of the cross section of the sample of Example 1, the attention was focused on the lattice images of the permalloy as the crystalline soft magnetic layer 53, MgO as the non-magnetic orientation control layer 7, and the magnetic crystal grains of the magnetic recording layer respectively. As a result, the following fact was revealed. That is, the strain and the crystal defect were observed to some extent at the lamination interface of each of the layers. However, the lattice was approximately continuous from the permalloy to the magnetic recording layer, and the respective layers were epitaxially grown.

The crystalline orientation relationship was determined for each of the layers from the lattice image and the electron beam diffraction image of each of the layers. As a result, the permalloy exhibited the (001) plane orientation, the MgO film formed thereon exhibited the (001) plane orientation, and the magnetic crystal grains of the magnetic recording layer also exhibited the (001) plane orientation. This result supports the result of the X-ray diffraction measurement.

Further, the attention was focused on the form of the crystal grains of each of the layers. As a result, a prism-shaped structure was exhibited, in which MgO and the magnetic crystal grains were grown while inheriting the form of the crystal grains of the permalloy. In the Fe—Ta—C layer as the microcrystalline deposition type soft magnetic layer 51, fine grains, which had grain diameters of about 2 nm to about 25 nm, were distributed. The electron beam diffraction image was investigated in order to identify the fine grains. As a result, a plurality of diffraction rings were observed. The crystal plane spacing was determined from the two diffraction rings which were distinctly distinguishable. As a result, one plane spacing was 0.20 nm, which was approximately coincident with the plane spacing of the Fe (110) plane. The plane spacing determined from the other diffraction ring was 0.25 nm, which was revealed to be approximately coincident with the plane spacing of the Ta—C (111) plane. The crystal grain diameter and the plane spacing of the lattice image were measured for 72 pieces of crystal grains for which the lattice image was clearly observed. As a result, 31 pieces of crystal grains exhibited a plane spacing of 0.25 nm within a range of the measurement error, revealing that the crystal grains were Ta—C fine grains. On the other hand, remaining 41 pieces exhibited a plane spacing of 0.20 nm within a range of the measurement error, revealing that the crystal grains were Fe fine grains.

The grain diameters of the grains were determined. As a result, the grain diameters were distributed within a range of 2 nm to 12 nm in the case of the Ta—C grains, and the average grain diameter was 6 nm. On the other hand, the crystal grain diameters of the Fe fine grains were within a range of 4 nm to 27 nm, and the average grain diameter was 14 nm. Further, the attention was focused on the lamination interface between the Fe—Ta—C layer and the permalloy. As a result, no epitaxial growth was found between the Fe—Ta—C layer and the permalloy.

The cross section of the sample of Comparative Example 1 was observed with TEM. Unlike the case of the sample of Example 1 described above, the lattice image was observed merely partially in the MgO layer as the non-magnetic orientation control layer 7, in which the crystallinity of the entire film was deteriorated. An electron beam diffraction image was investigated for the portion at which the lattice image was partially observed. As a result, it was revealed that MgO was subjected to the (001) plane orientation. The magnetic crystal grains of the magnetic recording layer formed on this portion had the lattice which was continuously grown to cause the epitaxial growth on MgO. The magnetic crystal grains in this situation were subjected to the (001) plane orientation, as revealed from the determination of the orientation from the plane spacing of the lattice image.

On the other hand, a lattice image, which was different from that of the (001) plane orientation, was exhibited for the magnetic crystal grains on MgO which exhibited no crystallinity. The orientation of the magnetic crystal grains was determined for the crystal grains according to the plane spacing of the lattice image. As a result, the crystal grains were subjected to the (111) plane orientation. In order to investigate the ratio of the crystal grains subjected to the (111) plane orientation in relation to the magnetic recording layer, the dark field image observation was performed. As a result, the crystal grains, which were subjected to the (111) orientation, were observed in an area which was not less than 90 % of the observation area. This result supports the result of the X-ray diffraction measurement.

Fine grains, which had grain diameters of about 2 nm to 25 nm, were distributed in the Fe—Ta—C layer as the microcrystalline deposition type soft magnetic layer 51. An electron beam diffraction image was investigated in order to identify the fine grains. As a result, a plurality of diffraction rings were observed. The crystal plane spacing was determined from the two diffraction rings which were distinctly distinguishable. As a result, one plane spacing was 0.20 nm, which was approximately coincident with the plane spacing of the Fe (110) plane. The plane spacing determined from the other diffraction ring was 0.25 nm, which was revealed to be approximately coincident with the plane spacing of the Ta—C (111) plane. The crystal grain diameter and the plane spacing of the lattice image were measured for 90 pieces of crystal grains for which the lattice image was clearly observed. As a result, 47 pieces of crystal grains exhibited a plane spacing of 0.25 nm within a range of the measurement error, revealing that the crystal grains were Ta—C fine grains. On the other hand, remaining 43 pieces of crystal grains exhibited a plane spacing of 0.20 nm within a range of the measurement error, revealing that the crystal grains were Fe fine grains. The grain diameters of the grains were determined. As a result, the grain diameters were distributed within a range of 2 nm to 14 nm in the case of the Ta—C grains, and the average grain diameter was 7 nm. No epitaxial growth was found between the Fe—Ta—C layer and the MgO layer.

The cross-sectional structure of the sample of Comparative Example 2 was observed with TEM. The attention was focused on the lattice images of the permalloy of the crystalline soft magnetic layer 53 as the back layer 5, MgO as the non-magnetic orientation control layer 7, and the magnetic crystal grains of the magnetic recording layer respectively. As a result, the following fact was revealed. That is, the strain and the crystal defect were observed to some extent at the lamination interface of each of the layers. However, the lattice was approximately continuous from the permalloy to the magnetic recording layer, and the respective layers were in the relationship of epitaxial growth. The crystalline orientation relationship was determined for each of the layers from the lattice image and the electron beam diffraction image of each of the layers. As a result, the permalloy exhibited the (001) plane orientation, the MgO film formed thereon exhibited the (001) plane orientation, and the magnetic crystal grains of the magnetic recording layer also exhibited the (001) plane orientation. This result supports the result of the X-ray diffraction measurement. This result was similar to the result of Example 1. However, the size of the crystal grain of the magnetic recording layer was large as compared with Example 1. In order to clarify this point, the grain diameter distributions of the magnetic grains of the magnetic recording layers of the respective samples of Example 1 and Comparative Examples 1 and 2 were compared with each other.

The average grain diameter and the grain diameter distribution of the magnetic grains for constituting the magnetic recording layer were determined in accordance with the following procedure. In a planar TEM image of the magnetic recording layer, 400 pieces of crystal grains were randomly selected from an observation field of 0.2 $\mu$m square. Contours of the crystal grains were imported as image information into a computer. The areas of the respective crystal grains were calculated from the imported data, and they were approximated with circular plates with equal areas for the respective crystal grains. The diameters of the circular plates were determined, and thus the grain diameters of the crystal grains were calculated. The grain diameter distribution of the 400 pieces of crystal grains had a shape of distribution capable of being approximated with a Gaussian distribution. Accordingly, the Gaussian distribution was applied to the obtained grain diameter distribution to determine the average crystal grain diameter and the grain diameter variance. Results of the measurement are shown below.

| Sample | Average crystal grain diameter (nm) | Variance (nm) |
|---|---|---|
| Example 1 | 7.2 | 1.1 |
| Comp. Ex. 1 | 6.0 | 3.1 |
| Comp. Ex. 2 | 21.3 | 2.5 |

The attention was focused on the crystal grains of the portion of the magnetic recording layer. As a result, areas having thicknesses of about 1 to 2 nm, in which no lattice image was observed, were present in the grain boundary between the crystal grains so that the adjoining grains were separated from each other, in all of the samples in a similar manner. The planar structure of the portion of the magnetic recording layer was observed with TEM. As a result, a structure was observed, in which crystalline grains were separated from other crystalline grains by an amorphous microstructure of 1 to 2 nm intervening therebetween.

Composition Analysis with μEDX Analyzer

In order to identify the elements for constituting the amorphous structure and the crystalline grains in the magnetic recording layer, the composition analysis was performed in the film in-plane direction by using a μEDX analyzer (spatial resolution: about 1 nm) carried on the electron microscope. As a result, only the Co element and the Pt element were observed on an EDX spectrum of the crystalline grains, and peaks of B and oxygen were without a range of the detection error. The composition was identified from the EDX spectrum. As a result, the composition of the crystalline grains was Co-52 atomic % Pt, approximately indicating the Co—Pt two-element ferromagnetic alloy. On the other hand, peaks of boron (B) and oxygen were detected in the amorphous area of the crystal grain boundary. It is estimated that the amorphous portion is composed of oxide of the B element. According to the result of the observation, it has been revealed that the magnetic recording layer has a structure in which the Co—Pt magnetic crystal grains are surrounded by and covered with the thin layer of the B oxide (thickness: 1 to 2 nm), and the respective magnetic crystal grains are magnetically isolated from each other while the exchange coupling action acting between the grains is broken by the thin layer of the B oxide.

A relative comparison is made as follows between the magnetic characteristics and the results obtained by the structural analysis for the samples as described above.

In the case of the sample of Comparative Example 2, the epitaxial growth takes place from the back layer to the magnetic recording layer. Therefore, the orientation of the magnetic recording layer is controlled such that the (001) plane as the easy axis of magnetization thereof is directed in the direction perpendicular to the substrate surface. However, the film thickness of the back layer is thickened, and the crystal grain diameters of the permalloy are increased at positions nearer to the magnetic recording layer, because the back layer is composed of the single layer of permalloy. The magnetic grains of the magnetic recording layer are also excessively increased in size due to the influence exerted thereby. For this reason, in the case of the sample of Comparative Example 2, although the rectangularity ratio was 0.99 in the magnetic characteristic in the direction perpendicular to the substrate surface, the coercivity merely exhibited the small value of 2.2 kOe.

In the case of the sample of Comparative Example 1, although the crystal grains of the magnetic recording layer are made fine and minute, the orientation of the magnetic crystal grains is not controlled. Therefore, the (001) plane as the easy axis of magnetization is not oriented in the direction perpendicular to the substrate surface, and the rectangularity ratio of the magnetization curve is the small value of 0.35.

On the contrary, in the case of the sample of Example 1 according to the present invention, the epitaxial growth is effected from the permalloy as the crystalline soft magnetic substance to the magnetic recording layer. Therefore, the magnetic recording layer is subjected to the orientation control so that the (001) plane as the easy axis of magnetization is directed in the direction perpendicular to the substrate surface. Further, the back layer was constructed by laminating the crystalline soft magnetic substance and the microcrystalline deposition type soft magnetic substance, and thus the permalloy as the crystalline soft magnetic layer was successfully formed to be thin. Therefore, the crystal grain diameters of permalloy are smaller than those obtained when the back layer is constructed with the single layer film of permalloy. Accordingly, in Example 1, the magnetic crystal grains in the magnetic recording layer are fine and minute, the coercivity is improved to be 3.5 kOe, and the rectangularity ratio is improved to be 0.98.

Evaluation of Recording and Reproduction Characteristics

Figure 4:
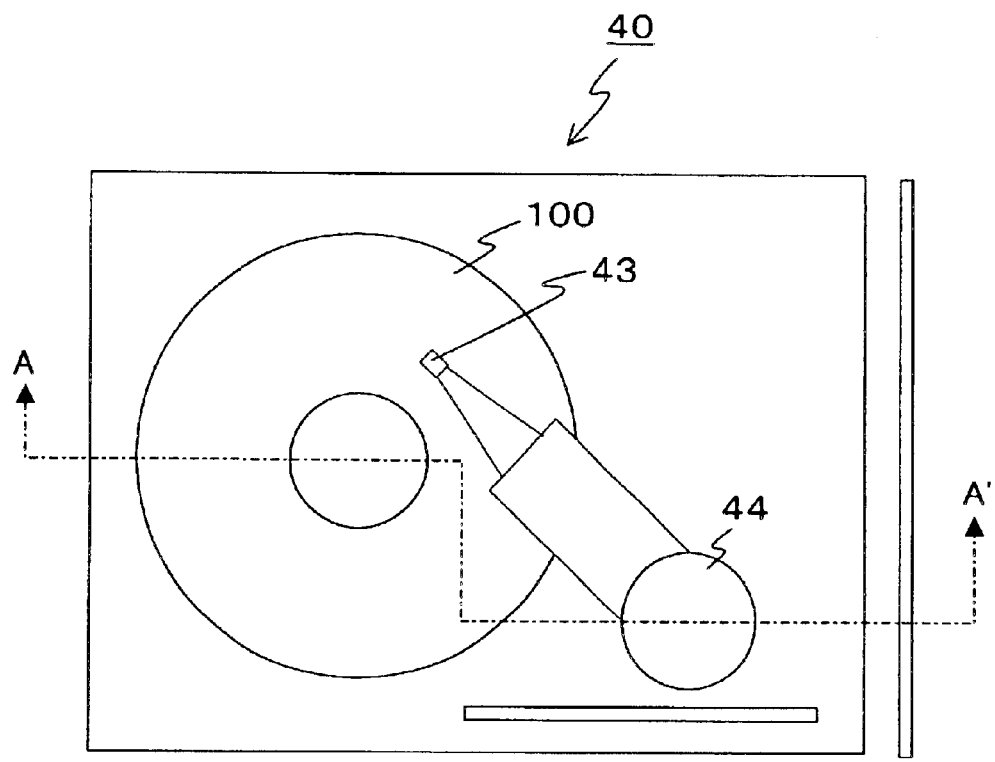
FIG. 4 shows a schematic arrangement of a magnetic recording apparatus used in Example 1.
Figure 5:
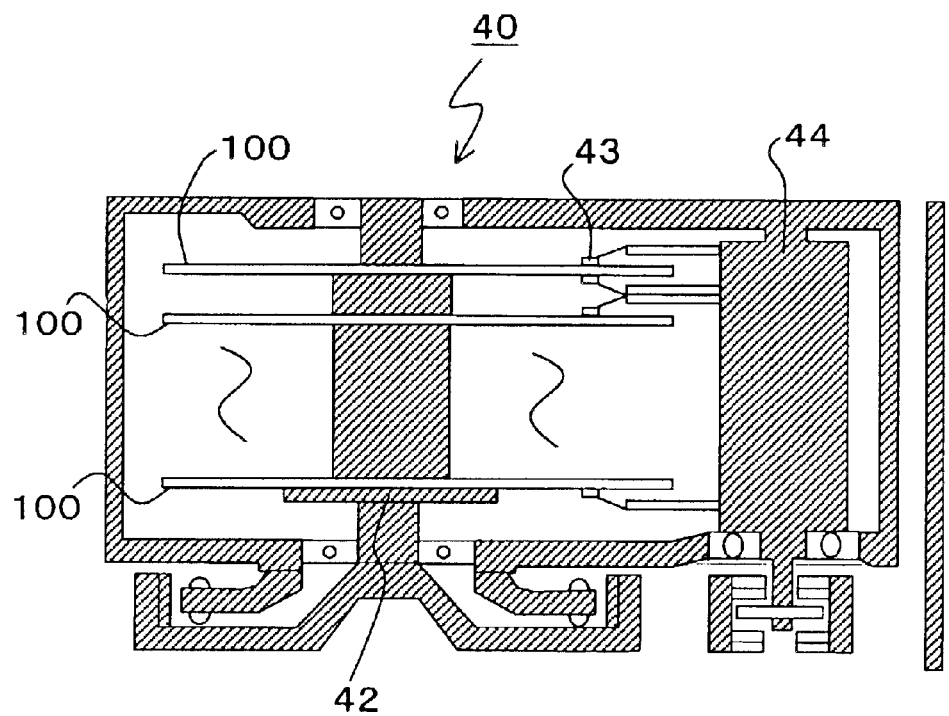
FIG. 5 shows a sectional view taken in a direction of A–A' illustrating the magnetic recording apparatus shown in FIG. 4.

The sample of Example 1 was incorporated into a magnetic recording apparatus to evaluate the recording and reproduction characteristics. FIGS. 4 and 5 show a schematic arrangement of the magnetic recording apparatus 40. FIG. 4 shows a schematic view illustrating upper surface portions of the magnetic recording apparatus 40, and FIG. 5 shows a schematic sectional view illustrating the magnetic recording apparatus 40 taken along a broken line A–A' shown in FIG. 4. A single magnetic pole head having a track width of 0.3 μm was used as the recording magnetic head. A dual spin-valve magnetoresistance effect type head having a track width of 0.2 μm and a gap length of 0.08 μm was used as the reproducing magnetic head. The recording magnetic head and the reproducing magnetic head are integrated into one unit which is indicated as a magnetic head 43 in FIGS. 4 and 5. The magnetic head 43 is controlled by a magnetic head-driving system 44. Magnetic disks 100 are coaxially rotated by a spindle 42 of a rotary driving system. The floating amount of the magnetic head 43 was 0.015 μm from the surface of the protective layer of the magnetic recording medium during the recording and during the reproduction. The relative velocity of the magnetic head 43 with respect to the magnetic disk was 11 m/s. The magnetic recording apparatus 40 as described above was used to compare the recording density $D_{50}$ at which the output was reduced to the half with respect to the low recording density and S/N at 500 kFCI. The samples of Comparative Examples 1 and 2 were also incorporated into the magnetic recording apparatus shown in FIGS. 4 and 5 in the same manner as described above to evaluate the recording and reproduction characteristics. Results of the evaluation are shown below.

| Sample | $D_{50}$ (kFCI) | S/N (dB) |
|---|---|---|
| Example 1 | 315 | 24 |
| Comp. ex. 1 | 240 | 19 |
| Comp. ex. 2 | 130 | 2 |

In order to investigate the difference in the recording and reproduction characteristics among the respective samples, the recording magnetization state of the magnetic recording layer was observed by using a magnetic force microscope (MFM). In the case of the sample of Comparative Example 2, no distinct recording pattern was observed in the magnetic recording layer in a recording state of 500 kFCI. This is considered to result from the fact that the crystal grain diameters are excessively increased in size. On the other hand, in the case of the sample of Comparative Example 1, although the recording pattern was formed, the pattern of recording magnetic domains fluctuated to a great extent in the magnetization transition area, and a large zigzag domain wall was observed. This is considered to result from the fact that any portion, in which the magnetization reversal tends to be caused, exists in the transition area because of the unsatisfactory crystalline orientation of the magnetic recording layer. On the contrary, in the case of the sample of Example 1, a distinct recording pattern was observed. When the minimum magnetization reversal unit was determined from the magnetic domain size in the AC erased state for the sample of Example 1, the diameter thereof was about 15 nm. As a result, the magnetization reversal unit was smaller than twice the crystal grain diameter. The fluctuation of the domain wall was decreased, the medium noise was reduced, and the recording and reproduction characteristics were improved.

Further, in order to investigate the spike noise for the respective samples, the reproduced signal was investigated in the AC erased state. As a result, no spike noise was observed for the samples of Example 1 and Comparative Example 1. On the other hand, in the case of Comparative Example 2, the spike noise was observed at four positions on one circuit of the disk. When the positions, at which the spike noise was observed, were expressed by the angle of rotation θ of the disk, the positions were located at 20°, 75°, 180°, and 240° as starting from the reference angle at which the measurement was started. The spike noise was reproducible, and the spike noise was detected at approximately identical angular positions over a range ranging from the inner circumference to the outer circumference of the disk. Therefore, it is considered that the domain walls exist in the radial direction of the disk in the back layer at the angular positions described above.

EXAMPLE 2

Figure 6:
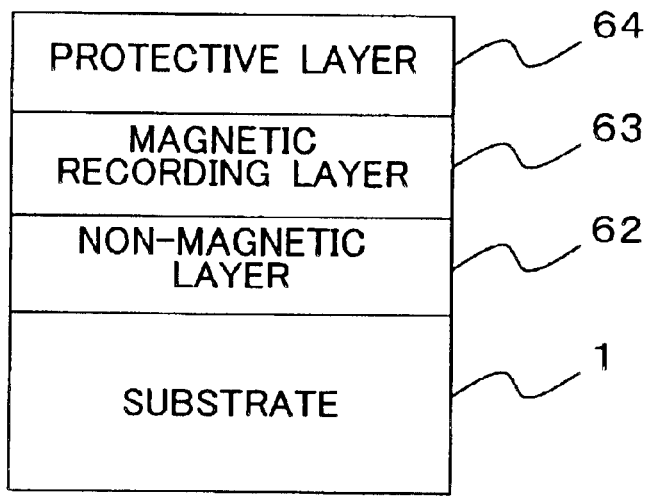
FIG. 6 shows a schematic sectional view illustrating a magnetic recording medium according to the present invention manufactured in Example 2.

FIG. 6 shows a schematic sectional view illustrating another specified embodiment of the magnetic recording medium according to the present invention. The magnetic recording medium comprises, on a substrate 1, a non-magnetic layer 62, a magnetic recording layer 63, and a protective layer 64. The magnetic recording medium was manufactured in accordance with the following procedure.

It is noted that in the following description, a glass substrate for the magnetic disk should be used in view of the industrial production, as the substrate of the medium to be used for the evaluation, in order to evaluate the characteristics of the manufactured medium. However, as described later on, an experiment was performed while applying the heat up to a high temperature at which it was difficult to use an ordinary glass substrate. Therefore, a thermally oxidized silicon substrate was firstly used to investigate the process for manufacturing the medium. After that, a glass substrate for the magnetic disk was used to manufacture the medium, and the characteristics of the magnetic disk were confirmed.

A thermally oxidized silicon substrate, which had approximately the same form as that of a glass substrate for the magnetic disk having a diameter of 2.5 inches, was washed, and then the substrate was installed to a sputtering film formation apparatus. Subsequently, evacuation was previously performed in an introducing chamber up to a vacuum degree of less than $1\times10^{-7}$ Torr, and then a film of MgO (20 nm) was formed as the non-magnetic layer 62. The MgO film was formed by using the ECR sputtering method. The Ar gas pressure was 0.2 mTorr during the film formation, the microwave for exciting the plasma was 500 W, and the electric power applied to the target was RF 500 W. On this condition, the film formation rate was 0.1 nm/second. In this procedure, the ECR sputtering method was used to form the MgO film. However, it is also allowable to use any ordinary film formation method for forming a thin film of an inorganic material, such as the RF sputtering method and the vacuum vapor deposition method.

Subsequently, after the substrate 1 was heated, the magnetic recording layer 63 (film thickness: 10 nm) was formed. In Example 2, the temperature for heating the substrate was changed within a temperature range of 50° C. to 600° C. to manufacture a plurality of samples (magnetic recording media). The substrate temperatures for the respective samples will be described later on. The ECR sputtering method was used to form the film of the magnetic recording layer 63. The film was formed under the same condition as that used in Example 1 except for the temperature for heating the substrate. Subsequently, the protective layer 64 was formed in the same manner as in Example 1 as well.

Samples, with which the recording and reproduction characteristics were evaluated, were previously subjected to tape varnish, and then a lubricant was applied thereto. Each of the manufactured sample media was cut out into small pieces to evaluate the film structure and the magnetic characteristics after performing the evaluation of the recording and reproduction characteristics as described later on.

The substrate temperatures were as follows during the film formation of the magnetic recording layers of the manufactured samples.

| Sample number | Substrate temperature (° C.) |
|---|---|
| A-1 | 50 |
| A-2 | 150 |
| A-3 | 250 |
| A-4 | 300 |
| A-5 | 350 |
| A-6 | 400 |
| A-7 | 450 |
| A-8 | 600 |

Measurement of Magnetization

Figure 7:
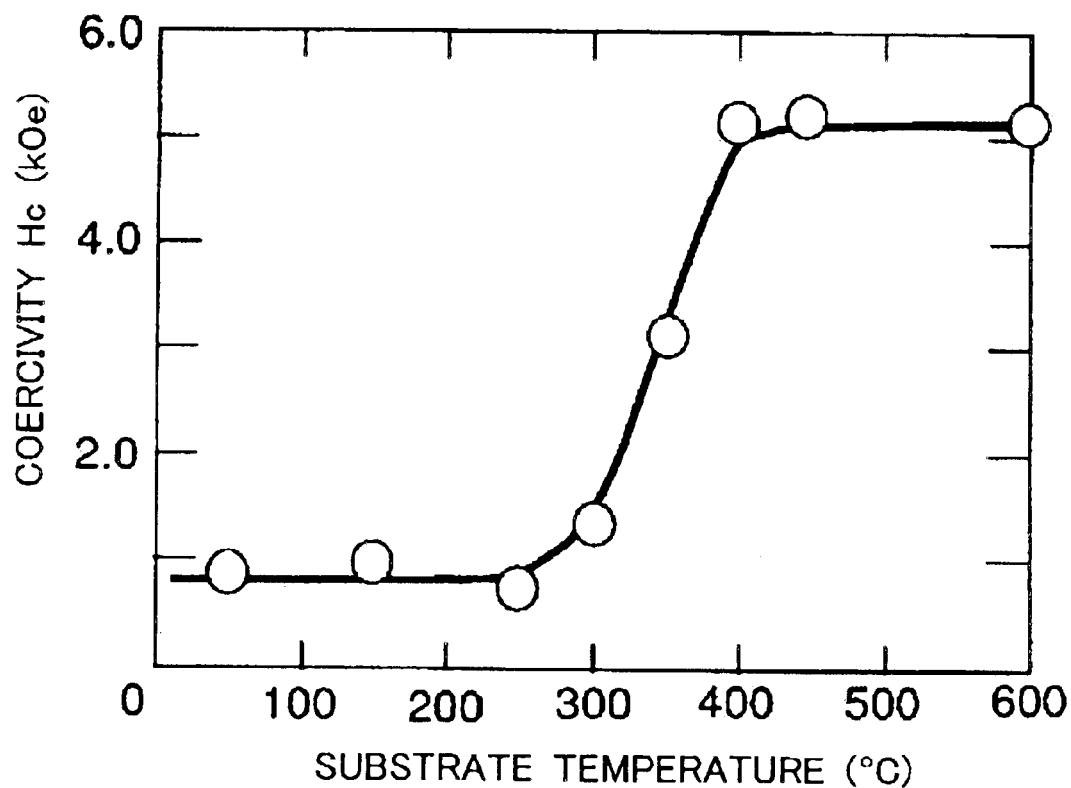
FIG. 7 shows a graph illustrating a relationship between the coercivity of the magnetic recording medium manufactured in Example 2 and the substrate temperature during the formation of a film of a magnetic recording layer.

In order to evaluate the magnetic characteristics of the manufactured samples, the magnetization was measured to obtain magnetization curves. FIG. 7 shows a relationship between the substrate temperature and the coercivity. As appreciated from FIG. 7, the coercivity is not more than 1 kOe in the case of the samples (A-1, 2, 3) having the low substrate temperatures, while the coercivity begins to increase when the substrate temperature exceeds 250° C., and the coercivity exhibits an approximately constant value at 400° C. In this situation, the coercivity was 5.2 koe.

X-ray Diffraction Measurement and Electron Microscopy

In order to investigate the microstructures of the samples for which the magnetic characteristics had been measured, the X-ray diffraction measurement and the electron microscopy were performed. In the X-ray diffraction measurement, a diffraction peak, which was generated from the (002) plane of MgO as the non-magnetic layer 62, was observed in the vicinity of 2θ=42.5° in each of the samples. The MgO film was grown while effecting the (100) orientation. In the case of the samples (A-1, 2, 3) having the substrate temperatures of not more than 250° C., a diffraction peak from the magnetic film was observed in the vicinity of 2θ=48°. In the case of the samples (A-4, 5) having the substrate temperatures exceeding 250° C., the peak in the vicinity of 2θ=48° became broad as the substrate temperature was increased. A tendency was exhibited such that the diffraction peak was separated into two peaks as the temperature approached 400° C. In the case of the samples (A-6, 7, 8) having the substrate temperatures of not less than 400° C., distinct peaks were observed separately at two positions of 2θ~47.5° and 2θ~49°. This result shows the fact that the crystalline structure of the magnetic recording layer was changed as the substrate temperature during the film formation of the magnetic recording layer was raised.

In order to clarify the change of the crystalline structure, the cross sections of the samples and the surfaces of the magnetic recording layers were observed with a transmission electron microscope (TEM). As a result of the observation of the cross sections of the samples with the electron microscope, a prism-shaped structure, in which the non-magnetic layer 62 and the magnetic recording layer 63 were continuously grown, was observed for each of the samples. When the attention was focused on the prism-shaped structure, then the lattice was continuous between MgO as the non-magnetic layer 62 and the magnetic recording layer 63 formed thereon, and the magnetic recording layer 63 was epitaxially grown on MgO while inheriting the crystalline form of MgO to form the crystalline grains. When the attention was focused on the magnetic recording layer 63, an area having a thickness of about 1 to 2 nm, in which no lattice image was observed, was present in the grain boundary of the crystalline grains so that the adjoining grains were separated from each other.

The surface of the magnetic recording layer was observed with TEM. As a result, a structure was observed, in which an amorphous substance of 1 to 2 nm intervened between the crystalline grains (at the crystal grain boundary), and the crystalline grains were separated from each other by the crystal grain boundary. In order to identify the elements for constituting the crystalline grains and the amorphous substance in the magnetic recording layer, the composition analysis was performed in the in-plane direction by using a μEDX analyzer (spatial resolution: about 1 nm) carried on the electron microscope. As a result of the composition analysis, only the Co element and the Pt element were observed on an EDX spectrum of the crystalline grains, in which the peaks of B and oxygen were without a range of the detection error. When the composition was identified from the EDX spectrum, the composition in the crystalline grains was Co-52 atomic % Pt, approximately indicating the Co—Pt two-element ferromagnetic alloy. On the other hand, the peaks of B and oxygen were detected in the amorphous area in the crystal grain boundary. It is assumed that the amorphous substance is oxide of the B element. According to the result of the observation, it has been revealed that the magnetic recording layer 3 has a structure in which the Co—Pt magnetic crystal grains are surrounded and coated with a thin layer of B oxide (thickness: 1 to 2 nm). Further, it has been revealed that the respective magnetic crystal grains are magnetically isolated from each other while the exchange interaction acting between the grains is broken.

In order to investigate the microstructure of the magnetic crystal grains, the lattice image of the magnetic crystal grains was observed. From a TEM observation image for the plane of each of the samples, 200 pieces of crystal grains were randomly selected from an observation field of 0.2 μm square to observe their lattice images. As a result, in the case of Sample A-2, although the lattice defect was observed in the magnetic grains, approximately square lattice images were observed for the respective crystal grains. In this case, only the lattice image of the fcc crystalline structure, in which the lattice length indicated a constant value, was observed. On the other hand, in the case of Sample A-7 having the substrate temperature of 450° C., 172 pieces of the crystal grains of the 200 pieces exhibited approximately rectangular lattice images. The lattice images were of the $L1_0$ structure in which the lattice constant differed between the a-axis direction and the c-axis direction. The remaining 28 pieces of the crystal grains had the fcc structure having approximately square lattice images. In the case of the sample having the substrate temperature of 300° C., 112 pieces of crystal grains were observed to exhibit the fcc structure, and 88 pieces of crystal grains were observed to exhibit the $L1_0$ structure, in which the both types were present in a mixed manner. According to the result of the observation with the electron microscope and the result of the measurement of the X-ray diffraction, the magnetic grains of the magnetic recording layer have the fcc crystalline structure and they are in a state of random alloy in the case of the substrate temperature of not more than 250° C. When the substrate temperature is raised to be higher than 250° C., then the ordering of the magnetic grains is started, and the $L1_0$ structure in an ordered alloy state is observed, the ratio of which is increased as the substrate temperature is raised. When the substrate temperature exceeds 400° C., then the ordering of the magnetic grains is approximately completed, and the magnetic grains having the $L1_0$ structure dominantly exist. According to the result as described above and the result of the dependency of the coercivity on the substrate temperature shown in FIG. 7, the coercivity is increased as the ratio of the ordered alloy is increased.

Subsequently, the average grain diameter and the grain diameter distribution of the magnetic grains for constituting the magnetic recording layer were determined in accordance with the following procedure. In a planar TEM observation image of the magnetic recording layer, 400 pieces of crystal grains were randomly selected from an observation field of 0.2 μm square. Contours of the crystal grains were imported as image information into a computer. The areas of the respective crystal grains were calculated from the imported data, and they were approximated with circular plates with equal areas for the respective crystal grains. The diameters of the circular plates were determined, and thus the grain diameters of the crystal grains were calculated. The grain diameter distribution of the 400 pieces of crystal grains had a shape of distribution capable of being approximated with a Gaussian distribution. Accordingly, the Gaussian distribution was applied to the obtained grain diameter distribution to determine the average crystal grain diameter and the grain diameter variance. Results of the measurement are shown below.

| Sample number | Average crystal grain diameter (nm) | Variance (nm) |
| --- | --- | --- |
| A-1 | 6.2 | 0.8 |
| A-2 | 6.0 | 0.7 |
| A-3 | 6.5 | 0.5 |
| A-4 | 7.3 | 0.8 |
| A-5 | 7.7 | 0.7 |
| A-6 | 8.1 | 0.7 |
| A-7 | 8.7 | 0.7 |
| A-8 | 13.2 | 1.7 |

According to the results described above, the grain diameter is increased to some extent as the substrate temperature is raised. However, the crystal grains are not more than 10 nm at the substrate temperatures of not more than 450° C. On the contrary, in the case of Sample A-8, the crystal grains are excessively increased in size, and they are grown to have sizes above 10 nm. In the case of such sizes of the crystal grains, the bit is constituted by three pieces of crystal grains at the recording density in which the bit length is about 40 nm as described above. The bit is not recorded in a well-suited manner, and the medium noise is consequently increased upon the reproduction.

Recording and Reproduction Characteristics

Samples A-1 to A-8 were incorporated into the recording and reproducing apparatus shown in FIGS. 4 and 5 in the same manner as in Example 1 to evaluate the recording and reproduction characteristics of Samples A-1 to A-8. In Example 1, the magnetic head, in which the recording magnetic head and the reproducing magnetic head were integrated into one unit, was used as the magnetic head. However, the magnetic head may be constructed by carrying the recording magnetic head and the reproducing magnetic head on independent sliders respectively. Also in Example 2, the floating amount of the magnetic head was controlled to be 0.02 μm from the surface of the protective layer of the magnetic recording medium during the recording and the reproduction. The relative velocity of the magnetic head with respect to the medium was 11 m/s. The recording and reproducing apparatus as described above was used to compare the recording density $D_{50}$ at which the output was reduced to the half with respect to the low recording density and S/N at 500 kFCI. Results of the evaluation are shown below.

| Sample number | $D_{50}$ (kFCI) | S/N (dB) |
| --- | --- | --- |
| A-1 | 100 | 2 |
| A-2 | 110 | 3 |
| A-3 | 110 | 2 |
| A-4 | 170 | 8 |
| A-5 | 250 | 16 |
| A-6 | 310 | 21 |
| A-7 | 315 | 22 |
| A-8 | 220 | 14 |

In order to investigate the difference in the recording and reproduction characteristics, the recording magnetization state of the magnetic recording layer of each of the samples was observed by using a magnetic force microscope (MFM). In the case of Samples A-1 to A-4, no distinct recording pattern was observed in the magnetic recording layer in the recording of 500 kFCI. On the other hand, in the case of Sample A-8, although the recording pattern was formed in the magnetic recording layer, the pattern of recording magnetic domains fluctuated to a great extent in the magnetization transition area, and a large zigzag domain wall was observed. This is considered to result from the fact that the crystal grain diameter was excessively increased in size. On the contrary, in the case of Samples A-6 and A-7, a distinct recording pattern was observed. When the minimum magnetization reversal unit was determined from the magnetic domain size in the AC erased state for the two samples, then the diameter was about 15 nm in the case of Sample A-6, and the diameter was about 16 nm in the case of Sample A-7. As a result, the magnetization reversal unit was smaller than twice the crystal grain diameter. Accordingly, the fluctuation of the domain wall was decreased, the medium noised was reduced, and the recording and reproduction characteristics were improved.

In order to investigate the thermal stability of the recording magnetic domains recorded in the magnetic recording layer, the time-dependency of the decrease in reproduction output was investigated after performing the recording at 300 kFCI. As a result, in the case of Samples A-1 to A-4, the output was decreased by not less than 5% after 1000 hours. On the contrary, in the case of Samples A-6 and A-7, the decrease in output was not more than 0.5%. This result indicates the fact that the recording magnetic domains, which are recorded in Samples A-6 and A-7, are thermally stable.

According to the results described above, in the case of Samples A-6 and A-7, the medium noise is low, the recording and reproduction characteristics are improved, and the thermal stability is excellent as well. As for Samples A-6 and A-7, the substrate temperatures are 400° C. and 450° C. respectively during the film formation of the magnetic recording layers. At these temperatures, the film can be formed by using a glass substrate. Therefore, as in Example 2, when the temperature of the glass substrate is controlled to be about 400° C. to 500° C. while using the ECR sputtering method, the magnetic recording layer, which is composed of the ordered alloy, can be formed as the film on the glass substrate. Accordingly, a glass substrate for the magnetic disk having a diameter of 2.5 inches was used as the substrate to manufacture samples under the same condition as that adopted upon the production of Samples A-6 and A-7. Various types of characteristics were evaluated for the manufactured samples in the same manner as described above. As a result, the respective obtained characteristics exhibited values equivalent to those obtained for Samples A-6 and A-7 within ranges of the experimental error.

COMPARATIVE EXAMPLE 3

Figure 8:
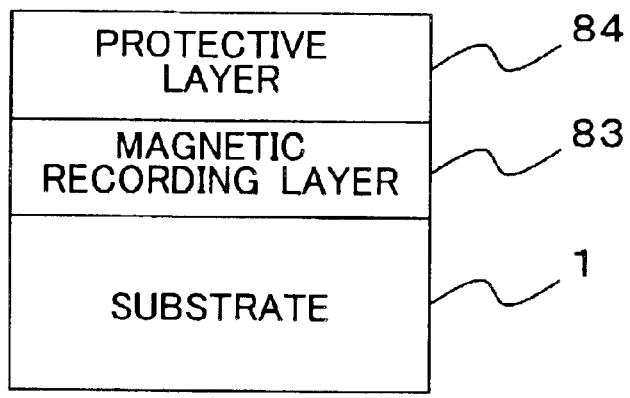
FIG. 8 shows a schematic sectional view illustrating a conventional magnetic recording medium manufactured in Comparative Example 3.

For the purpose of comparison, a magnetic recording medium having a cross-sectional structure shown in FIG. 8 was manufactured as a conventional magnetic recording medium. As shown in FIG. 8, the conventional magnetic recording medium comprises a magnetic recording layer 83 and a protective layer 84 on a substrate 1. A method for producing the magnetic recording medium as described above will be explained below.

At first, a thermally oxidized silicon substrate 1, which had approximately the same form as that of a glass substrate for the magnetic disk having a diameter of 2.5 inches, was washed, and then the substrate 1 was installed to a sputtering film formation apparatus. An introducing chamber of the sputtering film formation apparatus was previously evacuated up to a vacuum degree of less than $1 \times 10^{-7}$ Torr. The magnetic recording layer 83 (film thickness: 10 nm) having a Co—Pt/SiO$_2$ granular structure was formed on the substrate without heating the substrate. When the film of the magnetic recording layer 83 was formed, the co-sputtering method was used, in which a Co—Pt target and an SiO$_2$ target were used to perform the sputtering simultaneously with the both targets at a gas pressure, i.e., at an Ar gas pressure of 2 mTorr. The Co—Pt component of the magnetic recording layer 83 was manufactured by means of the RF magnetron sputtering method by using the target of Co-53 atomic % Pt, and the SiO$_2$ component was manufactured by means of the RF magnetron sputtering method by using the target of SiO$_2$. The film formation rate was adjusted for the Co—Pt component and the SiO$_2$ component so that the volume fraction of Co—Pt grains was 70% in the magnetic recording layer 83.

The magnetic recording layer 83 was formed on the substrate, followed by being moved to a heating stage in vacuum. After that, a heat treatment was performed in vacuum. The pressure was reduced until the back pressure of the vacuum chamber of the heating stage was about 2×10$^{-8}$ Torr before the heat treatment, and then the heat treatment was performed. In this procedure, a plurality of samples were manufactured by changing the temperature of the heat treatment within a range of 100 to 700° C. The heat treatment temperatures, at which the respective samples were manufactured, will be described later on. The heat treatment process was performed in accordance with the following procedure. At first, the temperature of the heating heater was adjusted so that the equilibrium state was obtained with respect to the preset temperature in 10 minutes. After the temperature arrived at the preset temperature to give the equilibrium state, the system was left to stand for 30 minutes, and then the heating heater was cut off. The samples were naturally cooled in vacuum after cutting off the heating heater.

A carbon (C) film (film thickness: 5 nm) was formed as the protective layer 84 at a point of time at which the substrate temperature was lowered to about 100° C. after performing the heat treatment for the magnetic recording layer 83. The C film was formed by using the DC magnetron sputtering method. The film formation condition was as follows. That is, the Ar gas pressure was 2 mTorr, and the electric power applied to the target was 0.3 kW. Samples, with which the recording and reproduction characteristics were evaluated, were previously subjected to tape varnish, and then a lubricant was applied thereto. Each of the manufactured sample media was cut out into small pieces to evaluate the film structure and the magnetic characteristics after performing the evaluation of the recording and reproduction characteristics as described later on.

The heat treatment temperatures for the respective manufactured samples are as follows.

| Sample number | Heat treatment temperature (° C.) |
|---|---|
| B-1 | none |
| B-2 | 200 |
| B-3 | 300 |
| B-4 | 400 |
| B-5 | 500 |
| B-6 | 600 |
| B-7 | 650 |
| B-8 | 700 |

Figure 9:
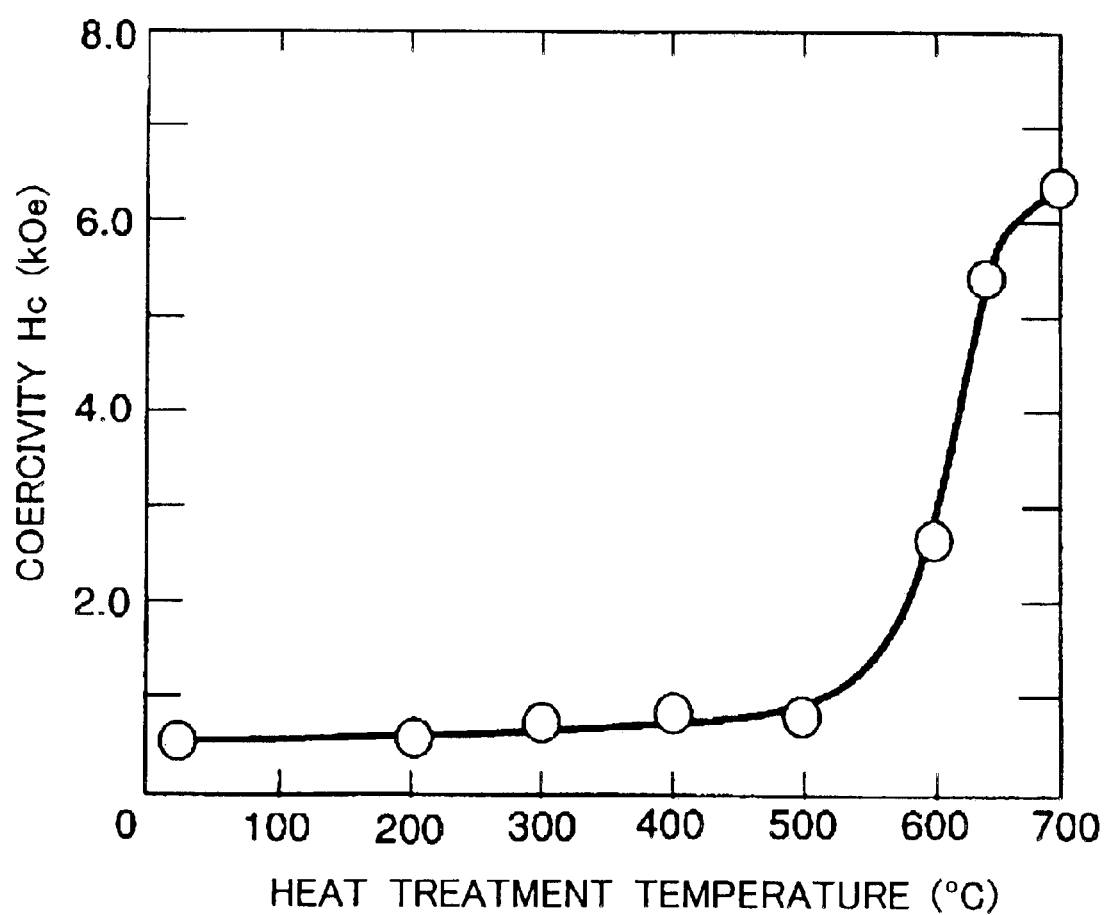
FIG. 9 shows a graph illustrating the temperature-dependent change of the magnetization of the magnetic recording medium manufactured in Example 2.

In order to evaluate the magnetic characteristics of the manufactured samples, the magnetization was measured to obtain magnetization curves. FIG. 9 shows a relationship between the heat treatment temperature and the coercivity obtained from the magnetization curves of the respective samples. It is appreciated from FIG. 9 that the coercivity is not more than 1 kOe when the heat treatment temperature is not more than 500° C., while the coercivity begins to increase when the heat treatment temperature exceeds 600° C., and the coercivity arrives at 6.4 kOe at 700° C. According to this fact, it is appreciated that the medium having the high coercivity can be obtained by raising the heat treatment temperature.

X-ray Diffraction Measurement and Electron Microscopy

In order to investigate the microstructures of the respective samples for which the magnetic characteristics had been measured, the X-ray diffraction measurement and the electron microscopy were performed. According to results of the X-ray diffraction measurement, the diffraction peak from the fcc (111) plain was observed as a main peak, and the fcc (200) peak or the like was additionally observed in the case of the samples (B-1 to B-5) in which the heat treatment temperatures were not more than 500° C. According to this fact, it is understood that the crystal grains of the magnetic grains are randomly oriented in the case of Samples B-1 to B-5. On the other hand, in the case of the samples manufactured by raising the heat treatment temperatures to be not less than 600° C., the diffraction peaks from the (111), (110), (001), and (200) planes of the fct structure were enhanced. Especially, in the case of the sample in which the heat treatment temperature was 700° C., the fct crystalline structure was dominant.

In order to investigate the microstructure of the magnetic recording layer, the surface of the magnetic recording layer was observed with a transmission electron microscope (TEM). As a result of the observation, an amorphous area having a thickness of about 2 to 4 nm, in which no lattice image was observed, was present in the grain boundary of the crystal grains so that the adjoining grains were separated from each other. In order to identify the elements for constituting the crystalline grains and the amorphous structure in the magnetic recording layer, the composition analysis was performed in the in-plane direction for the magnetic recording layer by using a $\mu$EDX analyzer (spatial resolution: about 1 nm) mounted on the electron microscope. As a result, only the Co element and the Pt element were observed on an EDX spectrum of the crystalline grains, and the composition in the crystalline grains was Co-51 atomic % Pt. On the other hand, peaks of Si and oxygen were detected in the amorphous area at the crystal grain boundary, and it was revealed that the amorphous portion was composed of SiO$_2$. According to the result of the observation, it has been revealed that the magnetic recording layer 3 has a granular structure in which the Co—Pt magnetic crystal grains are surrounded and coated with an oxide layer of SiO$_2$. Further, it has been revealed that the respective magnetic crystal grains are magnetically isolated from each other while the exchange interaction acting between the grains is broken.

In order to investigate the microstructure of the magnetic crystal grains, electron beam diffraction images were observed. As a result, in the case of Samples B-1 to B-5, the diffraction ring of the fcc (111) plane was principally observed. Additionally, the diffraction ring from the fcc (200) plane was also observed slightly. On the other hand, in the case of Sample B-8, the diffraction ring of the fct (111) plane was observed as a principal diffraction image. A plurality of diffraction rings other than the diffraction rings as described above were observed. However, they did not give sufficiently separated peaks, and it was difficult to identify the diffraction planes. According to the result of the observation with the electron microscope and the result of the measurement of the X-ray diffraction, it is considered that the magnetic grains of the magnetic recording layer have the fcc crystalline structure, and they are in a random alloy state at the heat treatment temperature of not more than 500° C. When the heat treatment temperature is raised to be not less than 600° C., then the ordering of the magnetic grains is started, the fct structure in the ordered alloy state begins to be observed, and the coercivity is increased.

Subsequently, the average grain diameter and the grain diameter distribution of the magnetic grains for constituting the magnetic recording layer were determined in accordance with the following procedure. In a planar TEM image of the magnetic recording layer, 400 pieces of crystal grains were randomly selected from an observation field of 0.2 μm square. Contours of the crystal grains were imported as image information into a computer. The areas of the respective crystal grains were calculated from the imported data, and they were approximated with circular plates with equal areas for the respective crystal grains. The diameters of the circular plates were determined, and thus the grain diameters of the crystal grains were calculated. The grain diameter distribution of the 400 pieces of crystal grains had a shape of distribution capable of being approximated with a Gaussian distribution. Accordingly, the Gaussian distribution was applied to the obtained grain diameter distribution to determine the average crystal grain diameter and the grain diameter variance. Results of the measurement are shown below.

| Sample number | Average crystal grain diameter (nm) | Variance (nm) |
|---|---|---|
| B-1 | 5.1 | 2.2 |
| B-2 | 5.2 | 2.3 |
| B-3 | 5.1 | 2.1 |
| B-4 | 7.3 | 2.5 |
| B-5 | 10.4 | 3.7 |
| B-6 | 14.8 | 4.1 |
| B-7 | 16.2 | 4.5 |
| B-8 | 18.4 | 5.2 |

According to this result, it is appreciated that the grain diameter is increased as the heat treatment temperature is raised. Especially, when the heat treatment temperature was raised to be not less than 600° C., then the grain diameter was conspicuously increased, and the grain diameter variance was conspicuously increased. According to this result, although the coercivity can be increased by performing the heat treatment when the magnetic recording layer is formed, the crystal grain diameter of the magnetic recording layer is excessively increased in size in a conspicuous manner, and the medium noise is increased upon the recording and reproduction. Samples B-6 to B-8 each having the coercivity capable of performing the high density recording were incorporated into the recording and reproducing apparatus shown in FIGS. 4 and 5 in the same manner as in Example 2 to evaluate the recording and reproduction characteristics under the same measurement condition as that adopted in Example 2. As a result, S/N was 11 dB for B-6, 12 dB for B-7, and 12 dB for B-8. Although the samples had the sufficient coercivity, the medium noise was large, and the recording and reproduction characteristics were unsatisfactory.

In order to investigate the result of the recording and reproduction characteristics, a magnetic force microscope (MFM) was used to observe the recording magnetization state of the magnetic recording layer of each of the samples. Although the recording pattern was formed in the magnetic recording layer of each of the samples, the recording magnetic domain pattern greatly fluctuated in the transition area, and the large zigzag domain wall was observed. This is considered to result from the fact that the crystal grain diameters were excessively increased.

Based on the results of Example 2 and Comparative Example 3, samples were manufactured with glass substrates for the magnetic disk of 2.5 inches under the conditions of Samples A-6 and A-7 in which the industrial glass substrate was successfully used and the high density recording was successfully adapted. As a result, various types of characteristics of the manufactured samples exhibited values equivalent to those of Samples A-6 and A-7 within ranges of the experimental error. According to the present invention, the problems involved in the conventional technique were solved, and the magnetic recording medium was successfully realized under the condition in which the magnetic recording medium is industrially producible. In the case of Samples A-6 and A-7, the heating temperature for the substrate is 400° C. to 450° C. Therefore, it is possible to manufacture the magnetic recording medium by using the industrial glass substrate.

EXAMPLE 3

Figure 10:
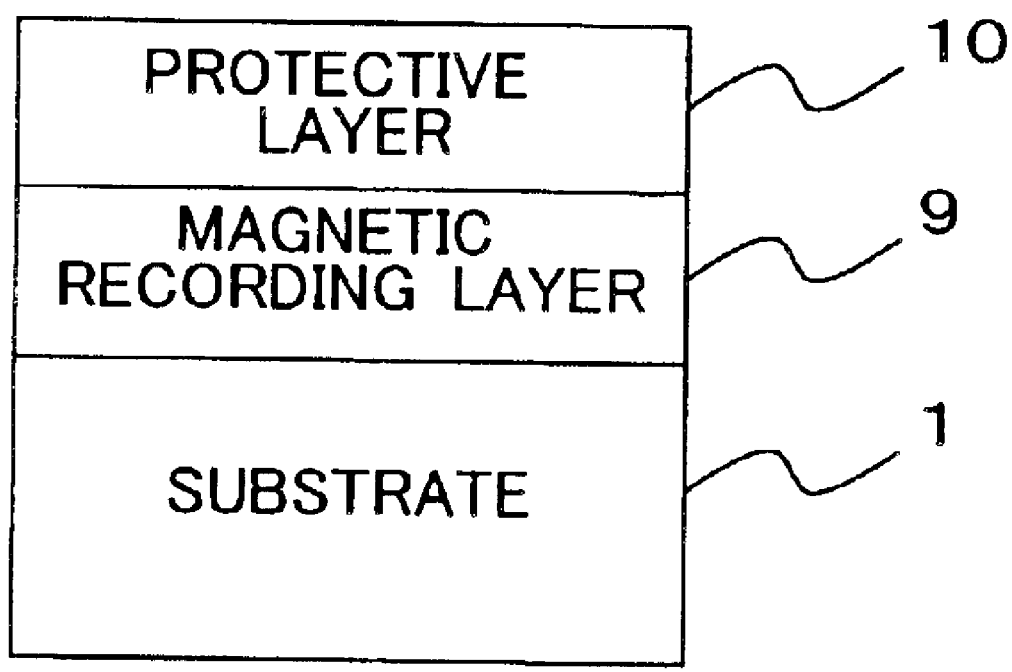
FIG. 10 shows a schematic sectional view illustrating a magnetic recording medium manufactured in Example 3.

FIG. 10 shows a schematic sectional view illustrating still another embodiment of the magnetic recording medium according to the present invention. The magnetic recording medium comprises a magnetic recording layer 9 and a protective layer 10 on a substrate 1. In Example 3, the magnetic recording layer 9 was formed directly on the substrate 1. However, in order to improve the crystalline orientation of the magnetic recording layer 9, a nonmagnetic layer may be provided between the substrate 1 and the magnetic recording layer 9. Alternatively, a two-layered perpendicular magnetic recording medium may be constructed by providing a back layer which is formed of a soft magnetic material and which is disposed between the substrate 1 and the magnetic recording layer 9.

An explanation will be made below about a method for producing the magnetic recording medium having the laminated structure shown in FIG. 10.

At first, a washed quartz glass substrate for the magnetic disk was installed to a sputtering film formation apparatus. Evacuation was previously performed in an introducing chamber up to a vacuum degree of less than $1 \times 10^{-7}$ Torr, and then the substrate was heated to 200° C. to remove any adsorption gas on the substrate surface. Subsequently, the substrate temperature was cooled to room temperature, and then the magnetic recording layer 9 was formed to have a film thickness of 20 nm. The film of the magnetic recording layer 9 was formed by using the ECR sputtering method. The film formation condition was as follows. That is, the Ar gas pressure was 0.2 mTorr, the microwave for exciting the plasma was 500 W, and the electric power to be applied to the target was RF 300 W. On this condition, the film formation rate was 0.05 nm/second. The following target was used. That is, Co-53 atomic % Pt was used as a base, and strip-shaped pellets of B and Cr were stuck to the sputtering surface to obtain the target. The composition of the magnetic recording layer was determined in a thin film state after the film formation by using the ICPS method (Inductively Coupled Plasma Spectroscopy). As a result, the average composition of the film was Co-41 atomic % Pt-5 atomic % B-12 atomic % Cr.

In Example 3, six types of magnetic recording media (Sample C-1 to Sample C-6) were manufactured by performing a heat treatment for the magnetic recording layer at various temperatures as described later on, after forming the magnetic recording layer 9. When the heat treatment was performed for the magnetic recording layer 9, the heat treatment was performed by using a heating stage of the sputtering apparatus in order to perform the heat treatment without taking out the sample to the atmospheric air after the formation of the magnetic recording layer 9. That is, the substrate, on which the magnetic recording layer had been formed, was moved to the heating stage, and the heat treatment was executed after the vacuum degree arrived at a value less than $1\times10^{-7}$ Torr. The heat treatment was performed for a period of time of 1 hour in a vacuum-evacuated state.

After the heat treatment, the protective layer 10 was formed in the same manner as in Example 1. Each of the manufactured samples was cut out into small pieces to evaluate the film structure and the magnetic characteristics. The heat treatment temperatures for the magnetic recording layer and the coercivities determined from the comparison of the magnetic characteristics as described later on are summarized below for the manufactured samples.

| Sample number | Heat treatment temperature (° C.) | Coercivity (kOe) |
| --- | --- | --- |
| C-1 | no heat treatment | 0.2 |
| C-2 | 180 | 0.2 |
| C-3 | 270 | 0.2 |
| C-4 | 360 | 0.1 |
| C-5 | 450 | 0.1 |
| C-6 | 540 | 4.7 |

COMPARATIVE EXAMPLE 4

A magnetic recording medium similar to that shown in FIG. 10 was manufactured in the same manner as in Example 3 except that the material for constituting the magnetic recording layer was changed to a Co—Pt two-element alloy. An explanation will be made below about a method for manufacturing the magnetic recording medium as described above.

At first, a washed quartz glass substrate for the magnetic disk was installed to a sputtering film formation apparatus. Evacuation was previously performed in an introducing chamber up to a vacuum degree of less than $1\times10^{-7}$ Torr, and then the substrate was heated to 200° C. to remove any adsorption gas on the substrate surface. Subsequently, the substrate temperature was cooled to room temperature, and then the magnetic recording layer 9 was formed to have a film thickness of 20 nm. The film of the magnetic recording layer 9 was formed by using the ECR sputtering method. As for the target, a Co—Pt alloy target (purity: 3N) was used. The film formation condition was as follows. That is, the Ar gas pressure was 0.2 mTorr, the microwave for exciting the plasma was 500 W, and the electric power to be applied to the target was RF 300 W. On this condition, the film formation rate was 0.06 nm/second. The composition of the magnetic recording layer was determined in a thin film state after the film formation by using the ICPS method (Inductively Coupled Plasma Spectroscopy). As a result, the average composition of the film was Co-48 atomic % Pt-5 atomic % B-12 atomic % Cr.

In Comparative Example 4, four types of magnetic recording media (Sample D-1 to Sample D-4) were manufactured by performing a heat treatment for the magnetic recording layer at various temperatures as described later on, after the formation of the magnetic recording layer 9. The heat treatment was performed in accordance with the same method as that adopted in Example 3 except for the heat treatment temperatures. After the heat treatment, the protective layer 10 was formed in the same manner as in Example 3. The heat treatment temperatures for the manufactured samples are shown below.

| Sample number | Heat treatment temperature (° C.) |
| --- | --- |
| D-1 | no heat treatment |
| D-2 | 180 |
| D-3 | 360 |
| D-4 | 540 |

Comparison of Magnetic Characteristics

Magnetization curves were measured in the direction perpendicular to the film surface by using a sample vibration type magnetic flux meter to evaluate the magnetic characteristics for the samples manufactured in Example 3 and Comparative Example 4. The coercivities were determined from the respective magnetization curves of Samples C-1 to C-6 manufactured in Example 3. The coercivities of the respective samples, i.e., Samples C-1 to C-6 are described above.

Figure 11:
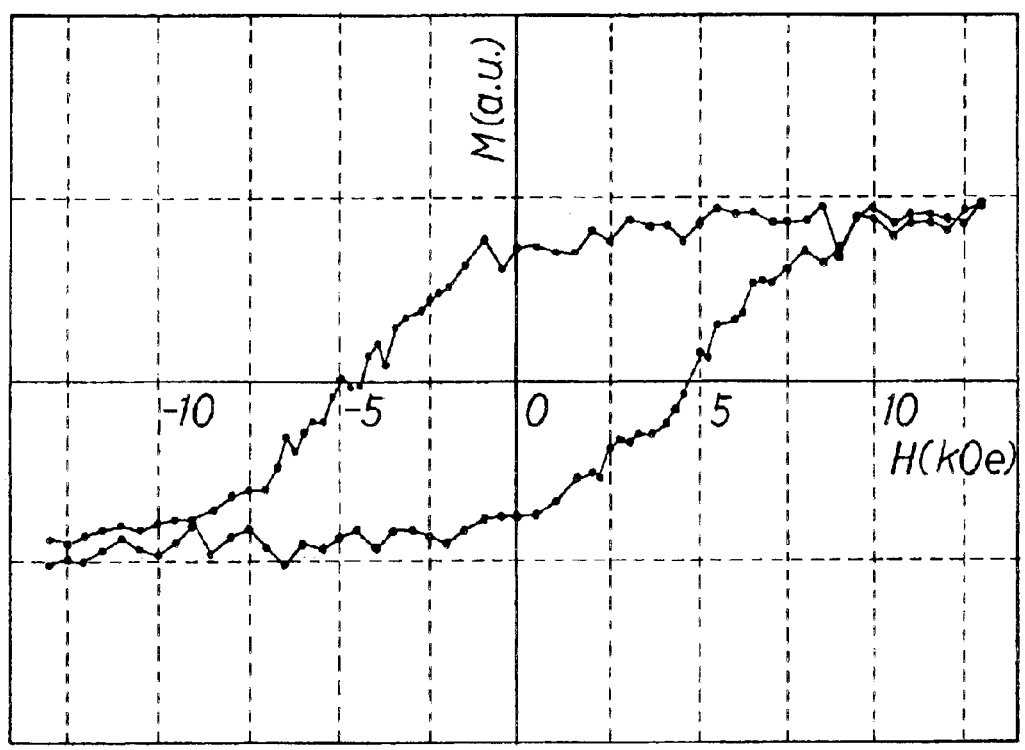
FIG. 11 shows a magnetization curve of a magnetic recording medium manufactured by performing a heating treatment at 540° C. for a magnetic recording layer.
Figure 12:
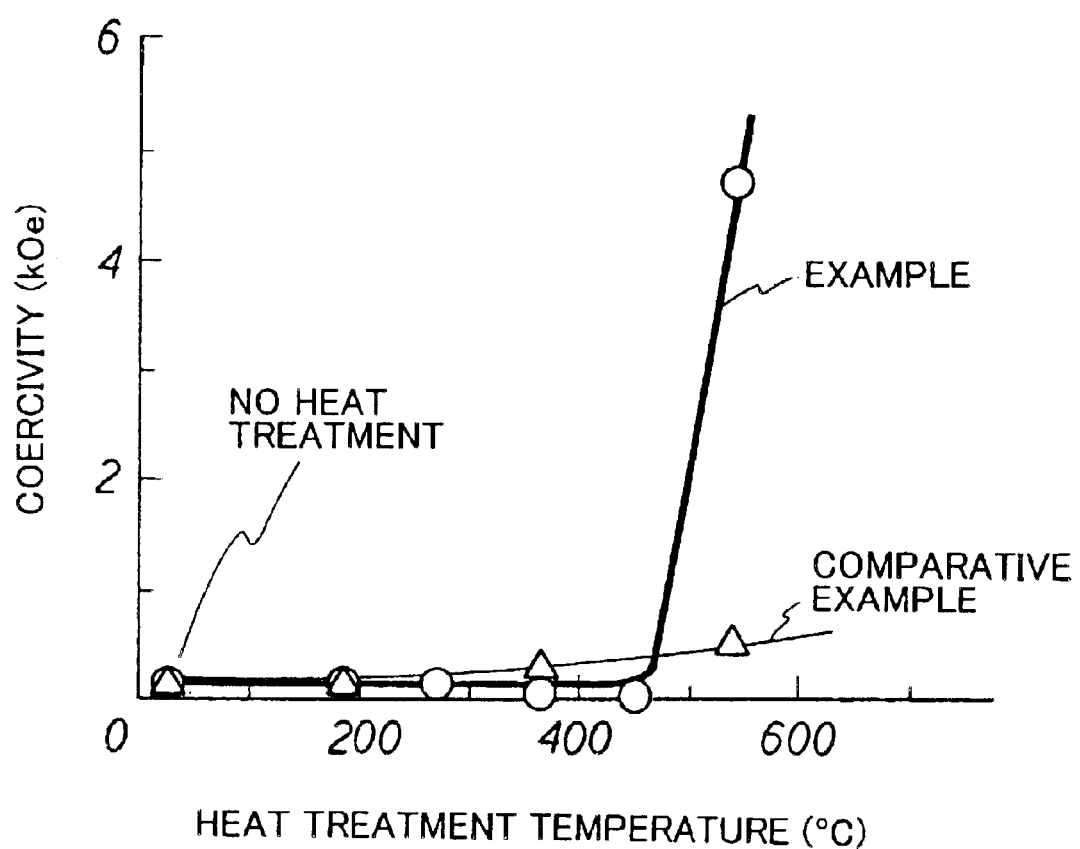
FIG. 12 shows a graph illustrating a relationship between the coercivity and the heat treatment temperature for the magnetic recording layer.

FIG. 12 shows a graph illustrating a relationship between the coercivity and the heat treatment temperature for the magnetic recording layer. As appreciated from the foregoing results and the graph shown in FIG. 12, in the case of Samples C-1 to C-5 in which the heat treatment temperatures for the magnetic recording layers were not more than 450° C., the coercivity was scarcely changed at about 0.1 to 0.2 kOe. On the contrary, in the case of Sample C-6 in which the heat treatment was performed at 540° C., the coercivity was suddenly increased to exhibit a value of 4.7 kOe. FIG. 11 shows a magnetization curve obtained by performing the measurement in the direction perpendicular to the film surface of Sample C-6. As shown in FIG. 11, the ratio of the decrease of the remanent magnetization with respect to the saturation magnetization is small. The rectangularity ratio S, which is represented by the ratio of the remanent magnetization with respect to the saturation magnetization (remanent magnetization/saturation magnetization), is 0.9.

In general, the larger the interaction between the magnetic grains is, the larger the slope of the magnetization curve in the vicinity of the coercivity, i.e., the slope of the magnetization curve at the magnetic field at which the magnitude of the magnetization is zero in the magnetization curve is. As the slope of the magnetization curve in the vicinity of the coercivity is increased, the mode of the magnetization reversal of the magnetic material is changed from the type in which only the magnetization of the magnetic grains is reversed while the individual crystal grain are isolated from each other (isolated magnetization reversal type) to the type in which the magnetization is reversed by the movement of the domain wall (domain wall movement type). In other words, as the magnetic isolation is advanced between the crystal grains, the slope of the magnetization curve in the vicinity of the coercivity is decreased, and the slope approaches a slope generated in the magnetization curve by the diamagnetic field in the direction perpendicular to the film surface. In the case of the magnetization curve shown in FIG. 11, the slope of the magnetization curve in the vicinity of the coercivity remains to have a magnitude which is about 1.5 times the slope generated by the diamagnetic field. Therefore, it is considered that the isolation of the crystal grains is advanced. On the other hand, in the case of the other samples, the slope of the magnetization curve in the vicinity of the coercivity exhibits a value which is tenfold or more. Therefore, it is considered that the interaction between the crystal grains is large in this state.

On the other hand, the magnetization was measured for Samples D-1 to D-4 of Comparative Example 4 in the same manner as described above to determine coercivities from obtained magnetization curves respectively. The coercivities of Samples D-1 to D-4 of Comparative Example 4 are shown below. A relationship between the coercivity and the heat treatment temperature for the magnetic recording layers of the samples of Comparative Example 4 is shown as the graph in FIG. 12 described above.

| Sample number | Coercivity |
| --- | --- |
| D-1 | 0.2 kOe |
| D-2 | 0.2 kOe |
| D-3 | 0.3 kOe |
| D-4 | 0.5 kOe |

In the case of Samples D-1 to D-4 of Comparative Example 4, the coercivity of 0.5 kOe was merely obtained at maximum.

X-ray Diffraction Measurement

Figure 13:
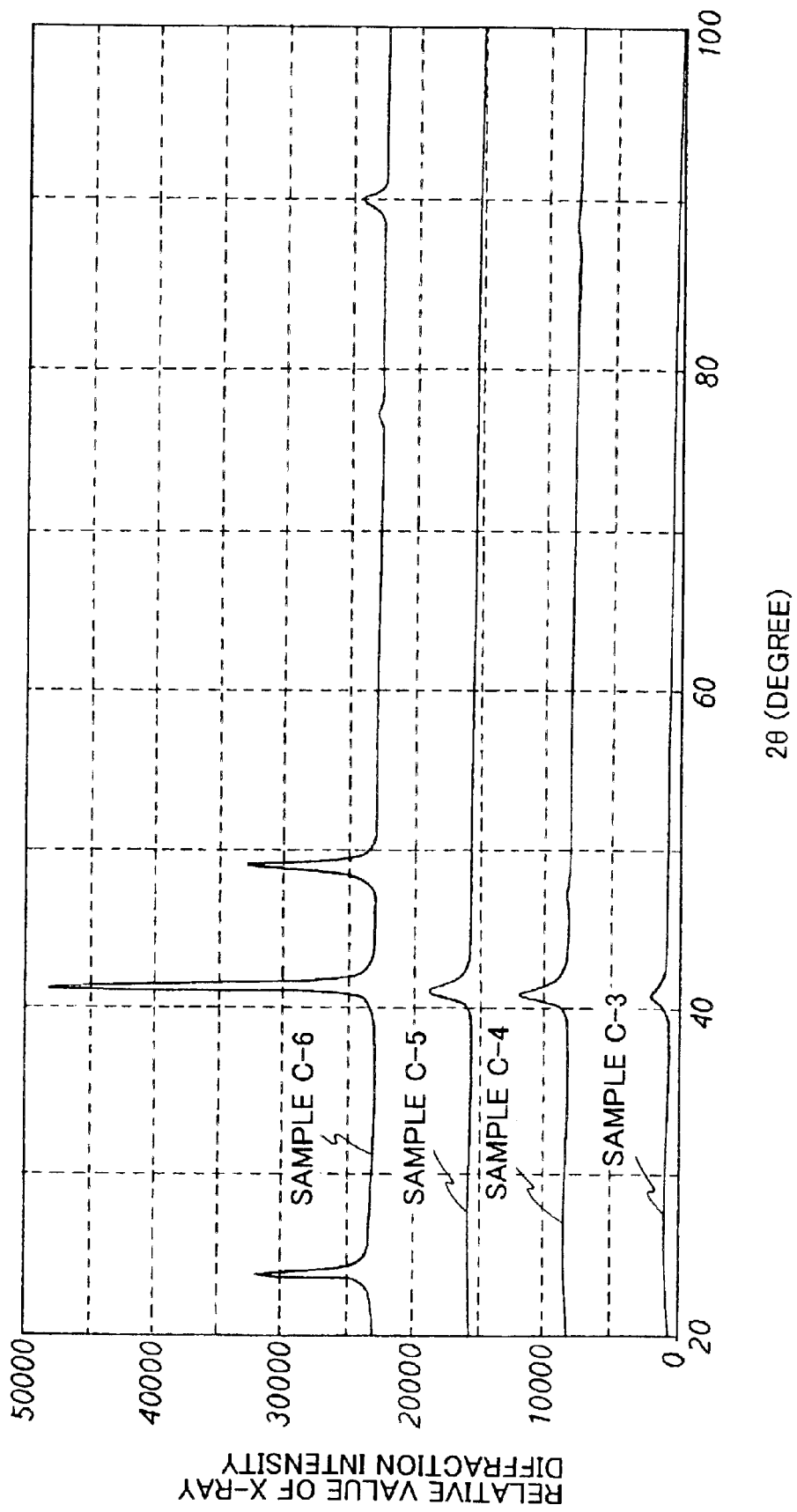
FIG. 13 shows X-ray diffraction spectra of Samples C-3 to C-6 manufactured in Example 3.

In order to investigate the difference in magnetic characteristics of the respective samples as described above in relation to the difference in crystalline structures of the samples, the X-ray diffraction measurement was performed. FIG. 13 shows results of the X-ray diffraction measurement for Samples C-3, C-4, C-5, and C-6. In the case of Samples C-3, C-4, and C-5 in which only the low coercivities were obtained, only a diffraction peak from the magnetic film, i.e., from the (111) plane of the magnetic recording layer was observed in the vicinity of $2\theta\sim41°$. Similar results were also obtained in the case of Samples C-1 and C-2. On the contrary, in the case of Sample C-6 in which the high coercivity was obtained, the position of the (111) peak of the magnetic film was shifted to the higher angle side, and new diffraction peaks were observed at $2\theta\sim24°$ and $2\theta\sim49°$. Among the newly observed peaks, the peak at $2\theta\sim24°$ was the diffraction peak from the (001) plane of the magnetic film, and the peak observed at $2\theta\sim49°$ was the diffraction peak from the (002) plane of the magnetic film. This result indicates the fact that the magnetic film of Sample C-6 has the ordered structure of $L1_0$. According to this fact, it is appreciated that the ordering can be advanced for the magnetic material for constituting the magnetic recording layer by performing the heat treatment for the magnetic recording layer at 540° C. as described above. The high coercivity as described above is realized owing to the fact that the magnetic material for constituting the magnetic recording layer is ordered as described above.

On the other hand, in the case of Samples D-1 to D-4 of Comparative Example 4, only a diffraction peak from the (111) plane of the magnetic film was observed in the vicinity of $2\theta\sim41°$. That is, in the case of Samples of Comparative Example 4, the magnetic film was not ordered even when the heat treatment was performed at 540° C.

Composition Analysis with $\mu$EDX Analyzer

In order to make comparison of the difference in characteristics between Sample C-6 and the other Samples C-1 to C-5 in view of the microstructure, the composition analysis was performed in the direction parallel to the film surface of the magnetic recording layer (the film in-plane direction) by using a $\mu$EDX analyzer (spatial resolution: about 2 nm) carried on a transmission electron microscope (TEM) for Sample C-6 and Sample C-1. In the composition analysis in the film in-plane direction, the Cr composition was firstly investigated for the inside of the crystal grains and the crystal grain boundary of the both samples. In the case of Sample C-1, the characteristic X-ray intensity of the Cr element at the crystal grain boundary was increased by 3 to 7% as compared with the X-ray intensity in the crystal grains. On the other hand, in the case of Sample C-6, the characteristic X-ray intensity of the Cr element at the crystal grain boundary was increased by not less than 20% as compared with the X-ray intensity in the crystal grains. As for Sample C-6, the characteristic X-ray intensity of the B element at the crystal grain boundary was slightly increased as compared with the X-ray intensity in the crystal grains. According to this fact, it is considered that the Cr element tends to segregate in the crystal grain boundary in the case of Sample C-6, and the segregation of Cr reduces the magnetic interaction between the crystal grains. Therefore, the magnetic interaction is reduced in the magnetic recording layer having the structure in which the Cr element is segregated to the crystal grain boundary as in the magnetic recording layer of Sample C-6. Accordingly, it is possible to decrease the unit of magnetization reversal. Therefore, the magnetic recording medium having the magnetic recording layer as described above makes it possible to remarkably reduce the medium noise.

The magnetic recording medium of the present invention, the method for producing the same, and the magnetic recording apparatus have been described above in accordance with the embodiments. However, the present invention is not limited thereto. The embodiments described above are illustrative of the case in which Co is used as the transition metal element of the ordered alloy of the magnetic recording layer and Pt is used as the noble metal element. However, Fe may be used in place of Co and Pd may be used in place of Pt.

The magnetic recording medium according to the first aspect of the present invention comprises the magnetic recording layer which is formed by using the ordered alloy containing B. Therefore, it is possible to provide the magnetic recording medium having the extremely high thermal stability. Further, the magnetic recording medium uses, as the substrate, the glass substrate which is suitable for the mass production. Therefore, it is possible to produce the magnetic recording medium at low cost.

The magnetic recording medium according to the second aspect of the present invention comprises the back layer which is constituted by using at least two types of the soft magnetic layers having different crystalline forms. Therefore, it is possible to reduce the medium noise while enhancing the crystalline orientation of the magnetic recording layer. Further, the magnetic recording medium uses, as the magnetic recording layer, the ordered alloy having the high magnetic anisotropy. Therefore, the magnetic recording medium is extremely excellent in thermal stability.

In the production method according to the third aspect of the present invention, the magnetic grains, which are used for the magnetic recording layer, can be made into the ordered alloy at the temperature region lower than those adopted in the conventional technique. Therefore, it is possible to use the glass substrate which is suitable for the mass production. It is possible to provide, at low cost, the magnetic recording medium which is capable of effecting the high density recording and which is thermally stable. Therefore, the present invention is extremely valuable to be industrially applied.

The magnetic recording apparatus of the present invention makes it possible to reliably record information on the magnetic recording medium having the high coercivity and reproduce recorded information at a low medium noise level. Therefore, the magnetic recording apparatus of the present invention is extremely preferred as the next-generation magnetic recording apparatus for the super high density recording.

What is claimed is:

1. A magnetic recording medium comprising:
   a substrate; and
   a magnetic recording layer which is formed on the substrate and composed of an ordered alloy;
   wherein the ordered alloy has an $L1_0$ type crystalline structure containing at least one transition metal element of Co and Fe and at least one noble metal element of Pt and Pd, and further contains B,
   wherein an atomic ratio between the transition metal element and the noble metal element satisfies the following relationship:
   $0.45 \leq$ transition metal element)/(transition metal element+noble metal element)$\leq 0.55$, and
   wherein the magnetic recording layer is composed of magnetic crystal grains and a crystal grain boundary to surround the magnetic crystal grains, and a relationship of C1>C2 is satisfied provided that C1 represents a concentration of the transition metal element in the magnetic crystal grains and C2 represents a concentration of the transition metal element in the crystal grain boundary.

2. The magnetic recording medium according to claim 1, wherein the magnetic recording layer further contains Cr.

3. The magnetic recording medium according to claim 1, further comprising at least one layer of non-magnetic underlayer which is disposed between the magnetic recording layer and the substrate, wherein the non-magnetic underlayer, which exists in contact with the magnetic recording layer, has one of crystalline structures selected from the group consisting of a body-centered cubic lattice (bcc), a body-centered tetragonal lattice (bct), a face-centered cubic lattice (fcc), a face-centered tetragonal lattice (fct), and an NaCl crystalline structure.

4. The magnetic recording medium according to claim 3, wherein the non-magnetic underlayer, which exists in contact with the magnetic recording layer, has one of the crystalline structures selected from the group consisting of the body-centered cubic lattice (bcc), the face-centered cubic lattice (fcc), and the NaCl crystalline structure, and a {100} crystal plane is parallel to the substrate.

5. The magnetic recording medium according to claim 3, wherein the non-magnetic underlayer, which exists in contact with the magnetic recording layer, has the crystalline structure of the body-centered tetragonal lattice (bct) or the face-centered tetragonal lattice (fct), and a (100) crystal plane or a (001) crystal plane is parallel to the substrate.

6. The magnetic recording medium according to claim 3, wherein the non-magnetic underlayer having the bcc crystalline structure is formed by using a simple substance of Cr, V, Mo, W, Nb, Ta, or Hf, or an alloy obtained by adding at least one element selected from the group consisting of Cr, V, Mo, W, Nb, Ti, Ta, Ru, Zr, and Hf to at least one selected from the group consisting of the elements of Cr, V, Mo, W, Nb, Ta, and Hf.

7. The magnetic recording medium according to claim 3, wherein the non-magnetic underlayer having the bct crystalline structure is formed by using a two-element alloy of Ni—Al or an alloy obtained by adding at least one element selected from the group consisting of V, Mo, W, Nb, Ti, Ta, Ru, Zr, and Hf to the two-element alloy of Ni—Al.

8. The magnetic recording medium according to claim 3, wherein the non-magnetic underlayer having the fcc crystalline structure contains at least one selected from the group consisting of Pt, Pd, Rh, Au, Cu, and Ag.

9. The magnetic recording medium according to claim 3, wherein the non-magnetic underlayer having the NaCl crystalline structure contains at least one selected from the group consisting of MgO, LiF, and NiO.

10. The magnetic recording medium according to claim 1, wherein B is contained in the magnetic recording layer within a range of 5 atomic % to 20 atomic %.

11. The magnetic recording medium according to claim 10, wherein a relationship of C3<C4 is satisfied provided that C3 represents a concentration of B in the magnetic crystal grains of the magnetic recording layer and C4 represents a concentration of B in the crystal grain boundary.

12. A magnetic recording medium comprising:
    a substrate; and
    a magnetic recording layer which is formed on the substrate and composed of an ordered alloy;
    wherein the ordered alloy has an $L1_0$ type crystalline structure containing at least one transition metal element of Co and Fe and at least one noble metal element of Pt and Pd, and further contains B,
    wherein an atomic ratio between the transition metal element and the noble metal element satisfies the following relationship:
    $0.45 \leq$ transition metal element)/(transition metal element+noble metal element)$\leq 0.55$, and
    wherein a relationship of (C5/10)<C6 is satisfied provided that C5 represents a content of oxygen in the magnetic crystal grains of the magnetic recording layer and C6 represents a content of oxygen in the crystal grain boundary.

13. The magnetic recording medium according to claim 1, wherein the magnetic grains for constituting the magnetic recording layer have an average crystal grain diameter within a range of 4 nm to 10 nm.

14. The magnetic recording medium according to claim 13, wherein a relationship of (2×d1)>d2 is satisfied provided that d1 represents the average crystal grain diameter and d2 represents a grain diameter of a minimum unit of magnetization reversal.

15. The magnetic recording medium according to claim 1, wherein the substrate is a glass substrate.

16. The magnetic recording medium according to claim 2, wherein the magnetic recording layer is composed of magnetic crystal grains and a crystal grain boundary to surround the magnetic crystal grains, and a concentration of Cr in the crystal grain boundary is higher than a concentration of Cr in the magnetic crystal grains.

17. A magnetic recording medium comprising:

a substrate; and a magnetic recording layer which is formed on the substrate and composed of an ordered alloy; and a back layer which is disposed between the substrate and the magnetic recording layer;

wherein the ordered alloy has an $L1_0$ type crystalline structure containing at least one transition metal element of Co and Fe and at least one noble metal element of Pt and Pd, and further contains B, wherein an atomic ratio between the transition metal element and the noble metal element satisfies the following relationship:

$0.45 \leq$(transition metal element)/(transition metal element+noble metal element)$\leq 0.55$, and wherein the back layer includes at least two soft magnetic layers having different crystalline forms.

18. The magnetic recording medium according to claim 17, wherein the back layer includes a microcrystalline deposition soft magnetic layer which is formed of a microcrystalline deposition soft magnetic substance, and a crystalline soft magnetic layer which is formed of a crystalline soft magnetic substance, and the crystalline soft magnetic layer is positioned on a side near to the magnetic recording layer in the back layer.

19. A magnetic recording apparatus comprising:

the magnetic recording medium as defined in claim 1;

a magnetic head which is used to record or reproduce information; and a drive unit which is used to drive the magnetic recording medium with respect to the magnetic head.

20. A magnetic recording apparatus comprising:

the magnetic recording medium as defined in claim 12;

a magnetic head which is used to record or reproduce information; and a drive unit which is used to drive the magnetic recording medium with respect to the magnetic head.

21. A magnetic recording apparatus comprising:

the magnetic recording medium as defined in claim 17;

a magnetic head which is used to record or reproduce information; and a drive unit which is used to drive the magnetic recording medium with respect to the magnetic head.

* * * * *